(12) United States Patent
Suga

(10) Patent No.: US 10,897,450 B2
(45) Date of Patent: Jan. 19, 2021

(54) COMMUNICATION METHOD AND COMMUNICATION APPARATUS

(71) Applicant: FUJITSU LIMITED, Kawasaki (JP)

(72) Inventor: Junichi Suga, Ota (JP)

(73) Assignee: FUJITSU LIMITED, Kawasaki (JP)

( * ) Notice: Subject to any disclaimer, the term of this patent is extended or adjusted under 35 U.S.C. 154(b) by 705 days.

(21) Appl. No.: 15/497,934

(22) Filed: Apr. 26, 2017

(65) Prior Publication Data

US 2017/0339101 A1 Nov. 23, 2017

(30) Foreign Application Priority Data

May 18, 2016 (JP) .................................. 2016-099773

(51) Int. Cl.
*H04L 29/12* (2006.01)
*H04L 29/08* (2006.01)

(52) U.S. Cl.
CPC ...... *H04L 61/1511* (2013.01); *H04L 61/2076* (2013.01); *H04L 67/2842* (2013.01); *H04L 61/6009* (2013.01)

(58) Field of Classification Search
CPC ............. H04L 61/2007; H04L 67/2842; H04L 61/1511; H04L 61/6009
See application file for complete search history.

(56) References Cited

U.S. PATENT DOCUMENTS

| | | | | |
|---|---|---|---|---|
| 7,372,809 B2 * | 5/2008 | Chen | ................. | H04L 29/12066 370/229 |
| 10,097,448 B1 * | 10/2018 | Howard | .............. | G06F 16/9574 |
| 2001/0014052 A1 * | 8/2001 | Ayukawa | ................. | G11C 8/00 365/230.03 |
| 2006/0200631 A1 * | 9/2006 | Seki | .................... | G06F 12/0862 711/137 |
| 2009/0281817 A1 * | 11/2009 | Ferrara | .................. | G06Q 10/06 705/1.1 |
| 2010/0014502 A1 * | 1/2010 | Singh | ....................... | H04B 7/12 370/343 |
| 2012/0131192 A1 * | 5/2012 | MacCarthaigh | ........ | H04L 43/16 709/226 |
| 2014/0019578 A1 * | 1/2014 | Lim | ................... | H04L 65/4084 709/213 |

(Continued)

FOREIGN PATENT DOCUMENTS

| | | |
|---|---|---|
| JP | 2003-280975 | 10/2003 |
| JP | 2010-103844 | 5/2010 |
| JP | 2012-103910 | 5/2012 |

OTHER PUBLICATIONS

JPOA—Office Action of Japanese Patent Application No. 2016-099773 dated Oct. 23, 2019 with Full Machine Translation.

*Primary Examiner* — Ario Etienne
*Assistant Examiner* — Kidest Mendaye
(74) *Attorney, Agent, or Firm* — Fujitsu Patent Center

(57) ABSTRACT

A communication method executed by a processor included in a communication apparatus, the method includes receiving an inquiry about an address allocated to a server identified with a domain name from a terminal apparatus; determining an address allocated to the server identified with the domain name or an address allocated to the communication apparatus as an address of which the terminal apparatus is notified based on a frequency of the inquiries about the domain name; and transmitting the determined address to the terminal apparatus.

12 Claims, 23 Drawing Sheets

(56) References Cited

U.S. PATENT DOCUMENTS

| | | | |
|---|---|---|---|
| 2015/0215267 A1* | 7/2015 | Kagan | H04L 61/1511 |
| | | | 709/245 |
| 2016/0323409 A1* | 11/2016 | Kolhi | H04L 61/1511 |
| 2017/0111389 A1* | 4/2017 | Kasman | H04L 63/1458 |

* cited by examiner

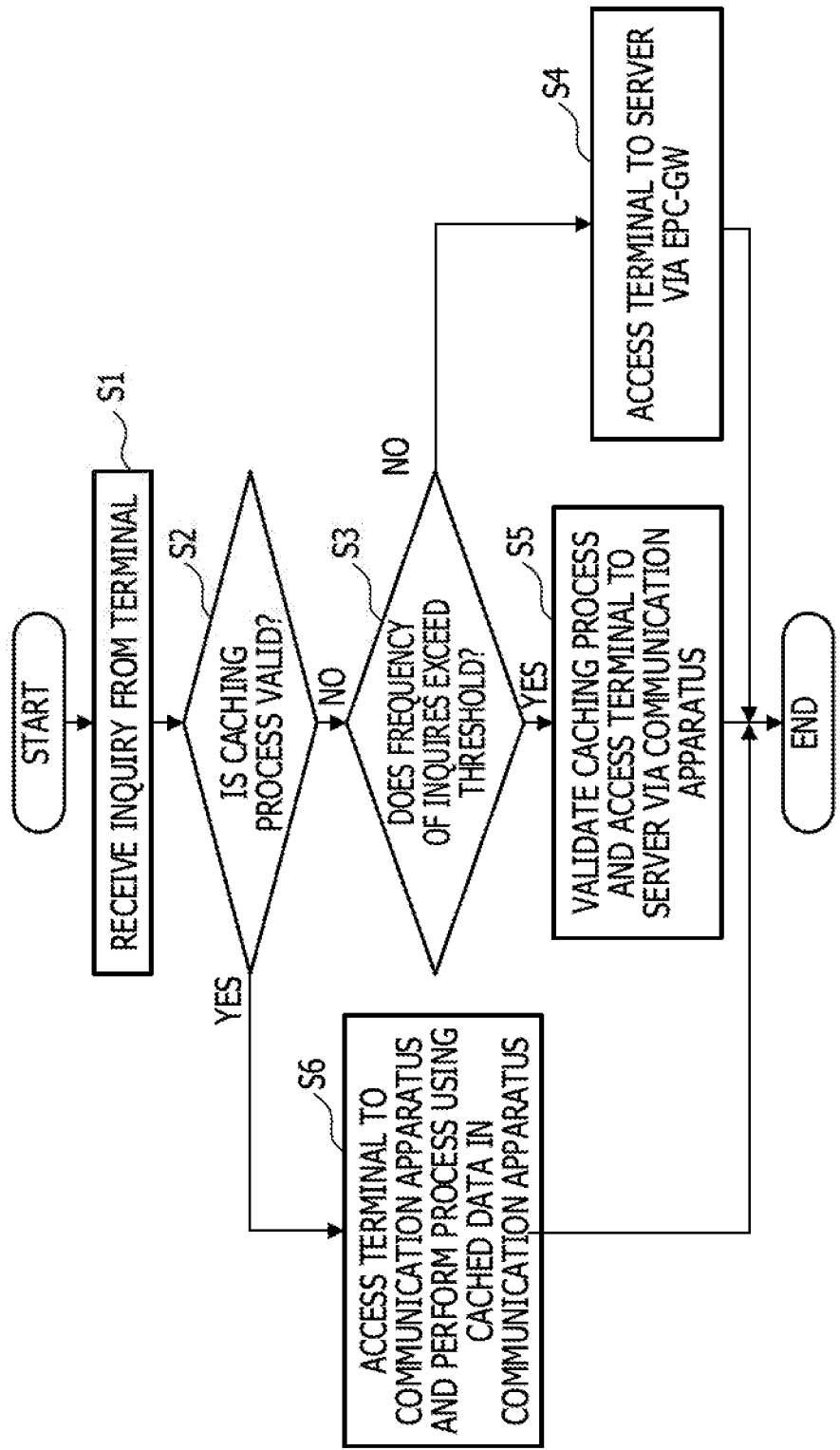

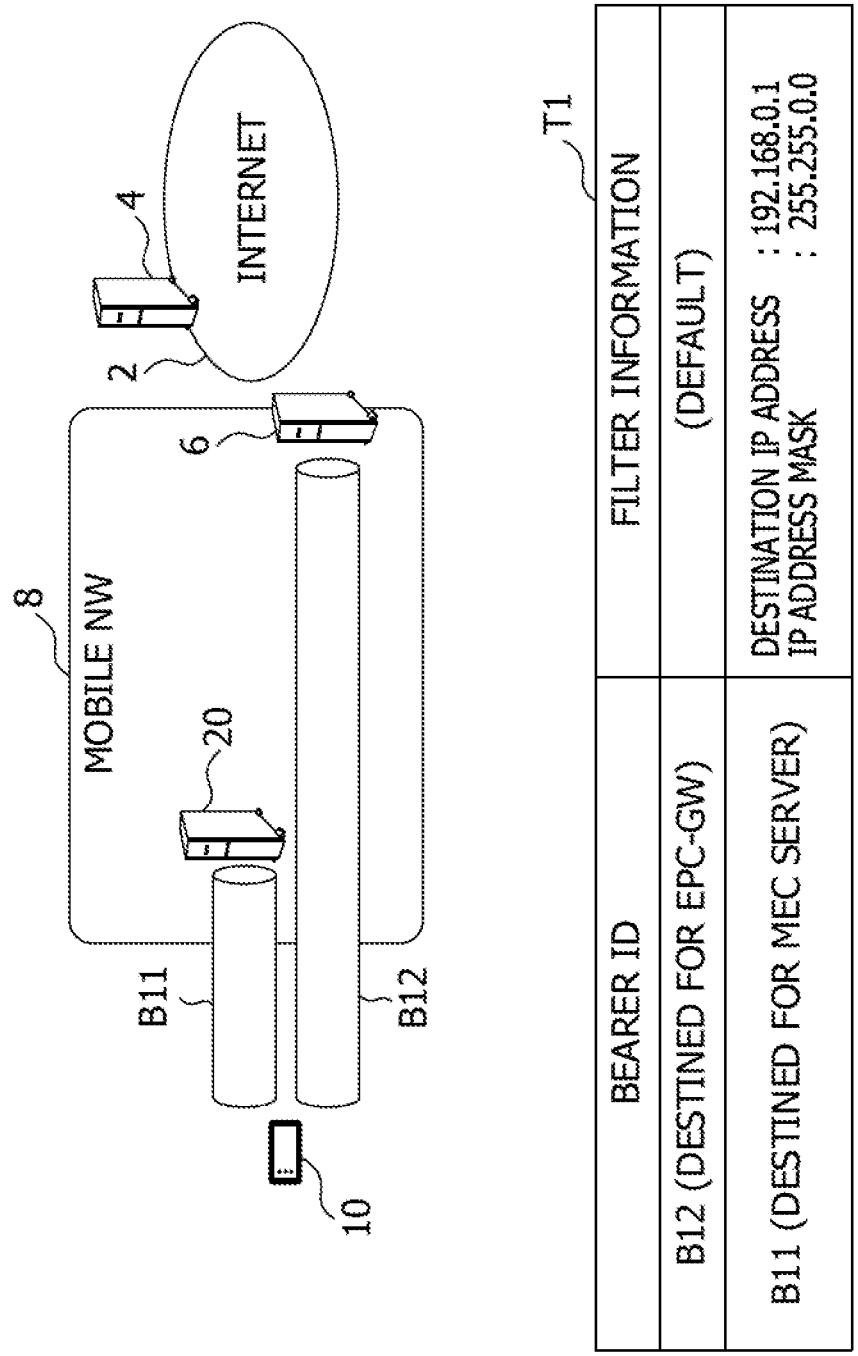

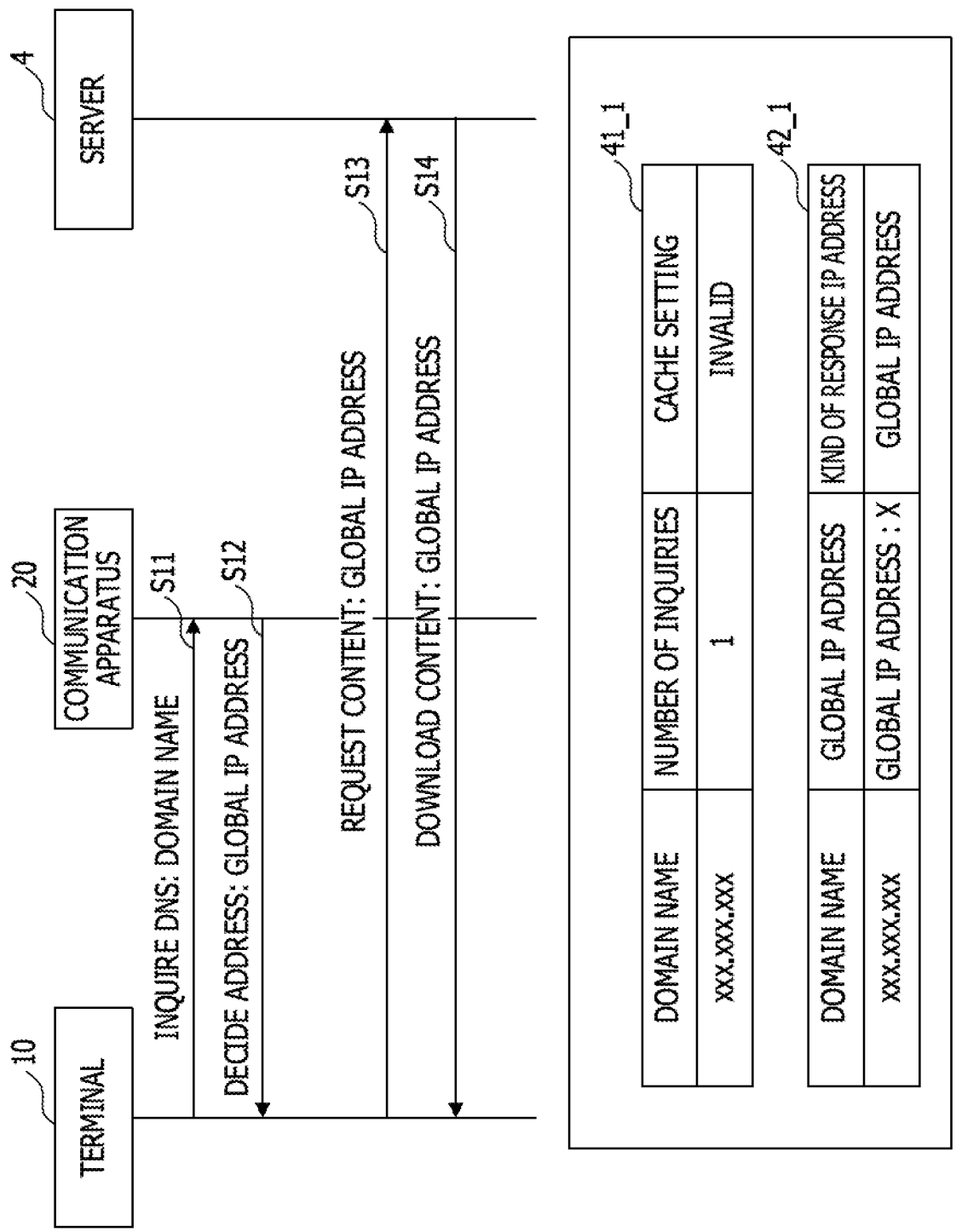

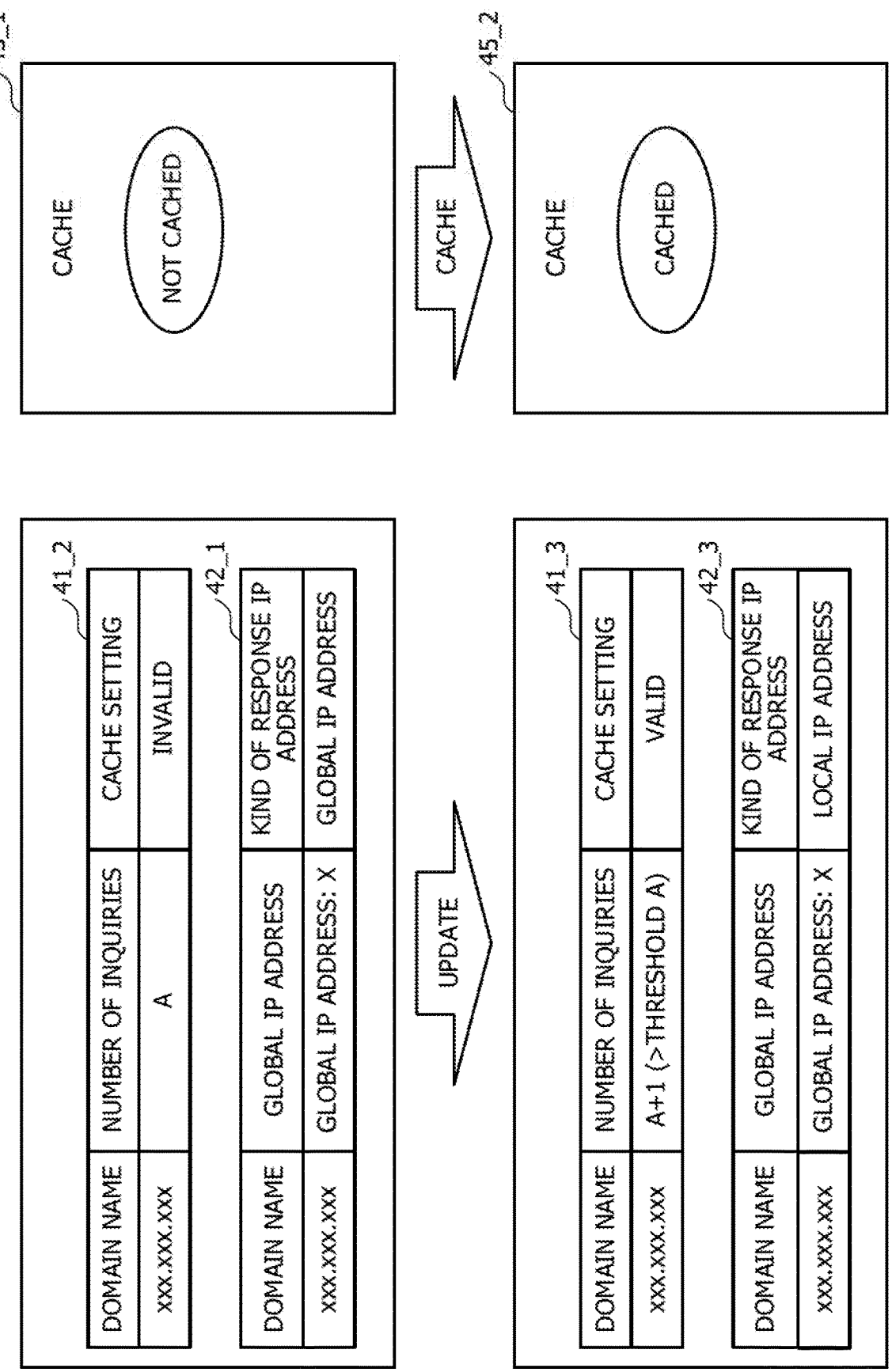

| TERMINAL IP ADDRESS | TERMINAL PORT NUMBER | IP ADDRESS OF COMMUNICATION APPARATUS | PORT NUMBER OF COMMUNICATION APPARATUS |
|---|---|---|---|
| AAA | aaa | BBB | bbb |

F1

| TRANSMISSION SOURCE IP ADDRESS | DESTINATION IP ADDRESS | TRANSMISSION SOURCE PORT NUMBER | DESTINATION PORT NUMBER | URI OF CONTENT = DOMAIN NAME/PATH | DATA |
|---|---|---|---|---|---|
| AAA | BBB | aaa | bbb | URIa | DATA |

F2

| TERMINAL IP ADDRESS | IP ADDRESS OF COMMUNICATION APPARATUS | TERMINAL PORT NUMBER | SERVER PORT NUMBER | URI OF CONTENT = DOMAIN NAME/PATH | DATA |
|---|---|---|---|---|---|
| AAA | BBB | aaa | PoX | URIa | DATA |

F3

| IP ADDRESS OF COMMUNICATION APPARATUS | SERVER IP ADDRESS | PORT NUMBER OF COMMUNICATION APPARATUS | SERVER PORT NUMBER | URI OF CONTENT = DOMAIN NAME/PATH | DATA |
|---|---|---|---|---|---|
| IPb | X | bbb | PoX | URIa | DATA |

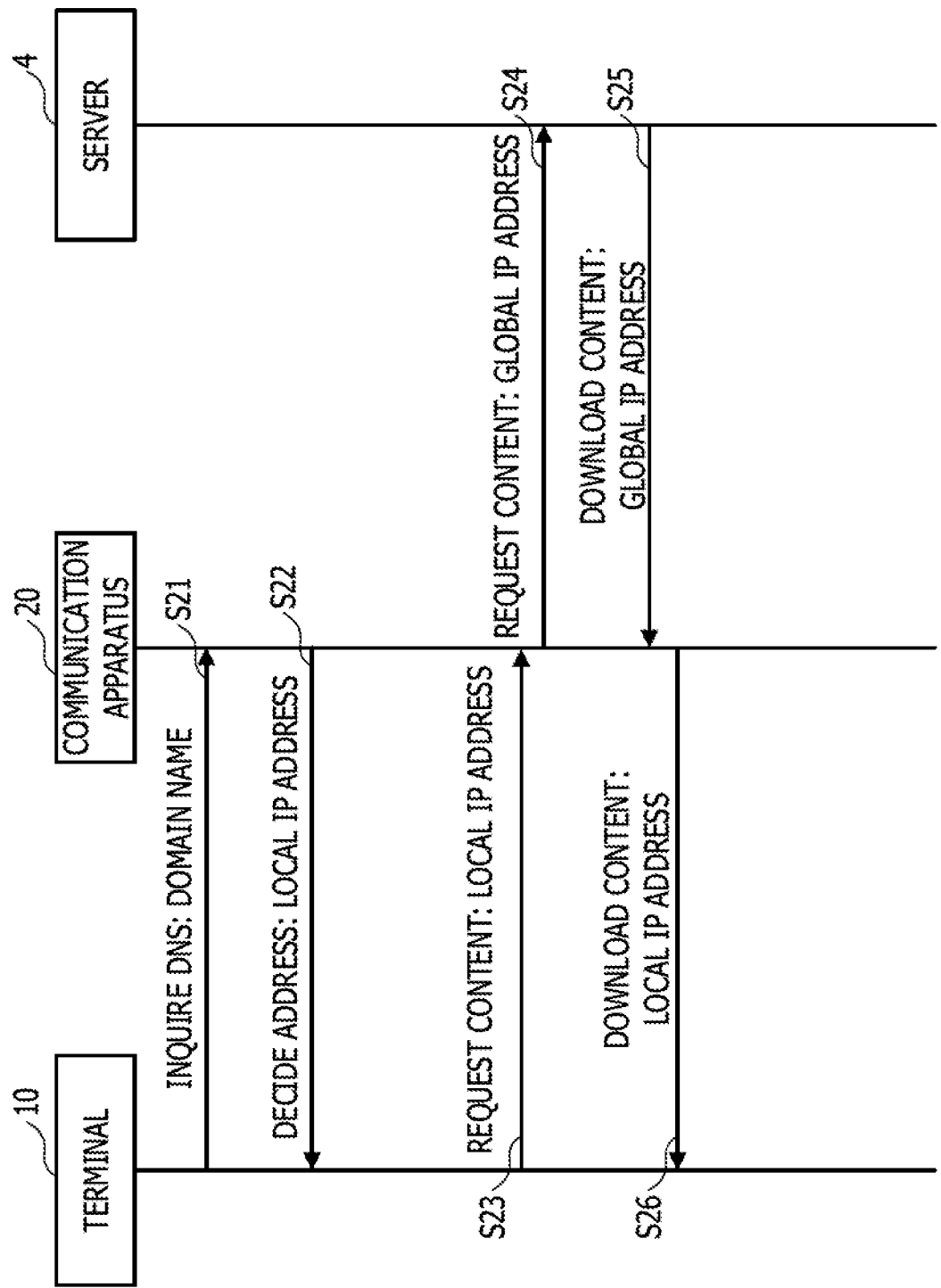

FIG. 11

Table 43:

| TERMINAL IP ADDRESS | TERMINAL PORT NUMBER | IP ADDRESS OF COMMUNICATION APPARATUS | PORT NUMBER OF COMMUNICATION APPARATUS |
|---|---|---|---|
| AAA | aaa | BBB | bbb |

F1:

| TRANSMISSION SOURCE IP ADDRESS | DESTINATION IP ADDRESS | TRANSMISSION SOURCE PORT NUMBER | DESTINATION PORT NUMBER | URI OF CONTENT = DOMAIN NAME/PATH | DATA |
|---|---|---|---|---|---|
| | | | | | |

F11:

| SERVER IP ADDRESS | IP ADDRESS OF COMMUNICATION APPARATUS | SERVER PORT NUMBER | PORT NUMBER OF COMMUNICATION APPARATUS | URI OF CONTENT = DOMAIN NAME/PATH | DATA |
|---|---|---|---|---|---|
| X | IPb | PoX | bbb | URIa | |

F12:

| IP ADDRESS OF COMMUNICATION APPARATUS | TERMINAL IP ADDRESS | SERVER PORT NUMBER | TERMINAL PORT NUMBER | URI OF CONTENT = DOMAIN NAME/PATH | DATA |
|---|---|---|---|---|---|
| BBB | AAA | PoX | aaa | URIa | |

FIG. 13

Table 41:

| DOMAIN NAME | NUMBER OF INQUIRIES | CACHE SETTING |
|---|---|---|
| xxx.xxx.xxx | XXX (>THRESHOLD A) | VALID |
| yyy.yyy.yyy | YYY | INVALID |
| zzz.zzz.zzz | - | TARGET EXCLUSION |

Table 42:

| DOMAIN NAME | GLOBAL IP ADDRESS | KIND OF RESPONSE IP ADDRESS |
|---|---|---|
| xxx.xxx.xxx | GLOBAL IP ADDRESS: X | LOCAL IP ADDRESS |
| yyy.yyy.yyy | GLOBAL IP ADDRESS: Y | GLOBAL IP ADDRESS |
| zzz.zzz.zzz | GLOBAL IP ADDRESS: Z | GLOBAL IP ADDRESS |

COMMUNICATION METHOD AND COMMUNICATION APPARATUS

CROSS-REFERENCE TO RELATED APPLICATION

This application is based upon and claims the benefit of priority of the prior Japanese Patent Application No. 2016-099773, filed on May 18, 2016, the entire contents of which are incorporated herein by reference.

FIELD

The embodiments discussed herein are related to a communication method and a communication apparatus.

BACKGROUND

In recent years, mobile edge computer (MEC) has been examined by standard institutes such as European Telecommunications Standards Institute (ETSI). In mobile edge computing, apparatuses installed at positions close to terminals such as a base station provides services to terminals. In mobile edge computing, services are provided near terminals. Therefore, delay times caused due to communication become short and traffics of mobile networks can be reduced. In the following description, apparatuses that are disposed near terminals and provide services to the terminals are referred to as MEC servers.

FIG. 1 is a diagram illustrating an example of a tunnel referred to as a bearer used for communication of a terminal 10. Case C1 is an example of a case in which communication is performed without involving an MEC server. In communication performed without involving an MEC server, the terminal 10 establishes a bearer with an evolved packet core gateway (EPC-GW) 6. Then, the terminal 10 communicates with an external apparatus of a mobile network via the EPC-GW 6. Here, the EPC-GW 6 is an external connection apparatus in a mobile network 8. The EPC-GW 6 is, for example, a relay point of the mobile network 8 and the Internet 2. Accordingly, the terminal 10 can communicate with a server 4 in the Internet 2 via a bearer B1 with the EPC-GW 6.

Case C2 illustrates an example of a bearer B2 used in a case in which the MEC server 15 is disposed near the terminal 10 in the mobile network 8 and a service is provided from the MEC server 15 to the terminal 10. In Case C2, the bearer B2 is established between the terminal 10 and the MEC server 15 and a process of a bearer used to communicate with the terminal 10 is executed in the MEC server 15. Therefore, the terminal 10 communicates an external apparatus of the mobile network 8 via the bearer B2 established with the MEC server 15. In the example of Case C2, the external apparatus of the mobile network 8 is the server 4 in the Internet 2. In the communication via the bearer B2, encapsulation, user encryption, or the like for transmitting user data in the mobile network 8 is performed in the MEC server 15.

FIG. 2 is a diagram illustrating an example of a process of the MEC server 15. A dynamic cache is proposed as one use case of mobile edge computing. Even in a case in which the dynamic cache is applied, a terminal 10 can communicate with an MEC server 15 in a mobile network 8. The MEC server 15 can communicate with servers 4 (4a to 4c) that retain content. Accordingly, the terminal 10 can acquire data in the servers 4 via the MEC server 15. At this time, the MEC server 15 caches the content acquired from the server 4. In the example of FIG. 2, the MEC server 15 acquires content X by accessing the server 4a in response to a request from the terminal 10. The MEC server 15 transmits the content X to the terminal 10 and stores the content X in the MEC server 15.

Thereafter, a request for acquiring the content X is transmitted again from the terminal 10 to the MEC server 15. Then, the MEC server 15 transmits the content X cached in the MEC server 15 to the terminal 10 (arrow A1). On the other hand, a request for acquiring content Y is transmitted from the terminal 10 to the MEC server 15 (arrow A2). In this case, since the MEC server 15 does not retain the content Y, the MEC server 15 accesses the server 4b that stores the content Y to acquire the content Y (arrow A3). Thereafter, the MEC server 15 stores the content Y and transmits the content Y to the terminal 10 (arrow A2).

As a related technology, a cache server that caches content after a predetermined cache condition is satisfied by increasing the number of requests is proposed (for example, Japanese Laid-open Patent Publication No. 2003-280975). A system is also proposed in which a content server specifies another content server that has second content referred to by first content, acquires name information of the other content server, and stores the first content with the name information in association therewith (for example, Japanese Laid-open Patent Publication No. 2010-103844).

Even though the MEC server 15 stores content, there is a case where the content is not used since a frequency of requests for it is quite small. It can also be considered that the MEC server 15 is set not to cache data for which requests are not made a predetermined number of times or more. Even in this case, however, the MEC server 15 acquires data from the server 4 and relays the data to the terminal 10. Then, because of a process executed on data not cached by the MEC server 15 access to the terminal 10 or the server 4 may impose a process load on the MEC server 15. In view of the above description, it is preferable to reduce a process load on an apparatus relaying communication between the terminal and the server.

SUMMARY

According to an aspect of the invention, a communication method executed by a processor included in a communication apparatus, the method includes receiving an inquiry about an address allocated to a server identified with a domain name from a terminal apparatus; determining an address allocated to the server identified with the domain name or an address allocated to the communication apparatus as an address of which the terminal apparatus is notified based on a frequency of the inquiries about the domain name; and transmitting the determined address to the terminal apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B are diagrams illustrating an example of a communication process according to an embodiment;

FIG. 6 is a diagram illustrating an example of a bearer used by a terminal;

FIG. 7 is a diagram illustrating an example of a communication process;

FIG. 8 is a diagram illustrating an update example of a table when the number of inquiries exceeds a threshold;

FIG. 9 is a diagram illustrating an example of a content request and a relay destination table;

FIG. 10 is a diagram illustrating an example of a communication process when the number of inquiries exceeds a threshold;

FIG. 11 is a diagram illustrating an example of a response;

FIG. 13 is a diagram illustrating an example of a process on data which is not a cache target;

DESCRIPTION OF EMBODIMENTS

Figure 1:
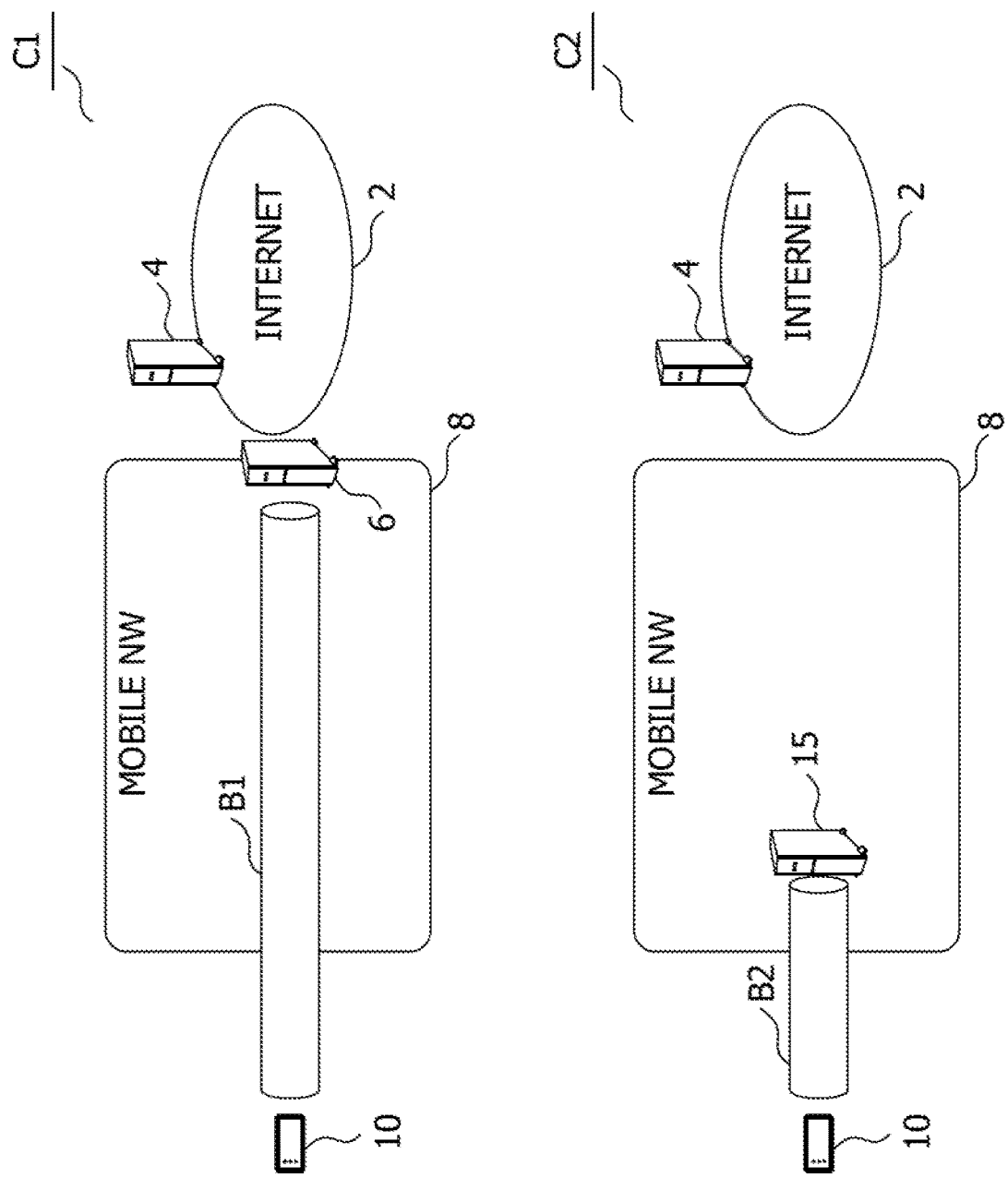
FIG. 1 is a diagram illustrating an example of a bearer used to communicate a terminal.
Figure 2:
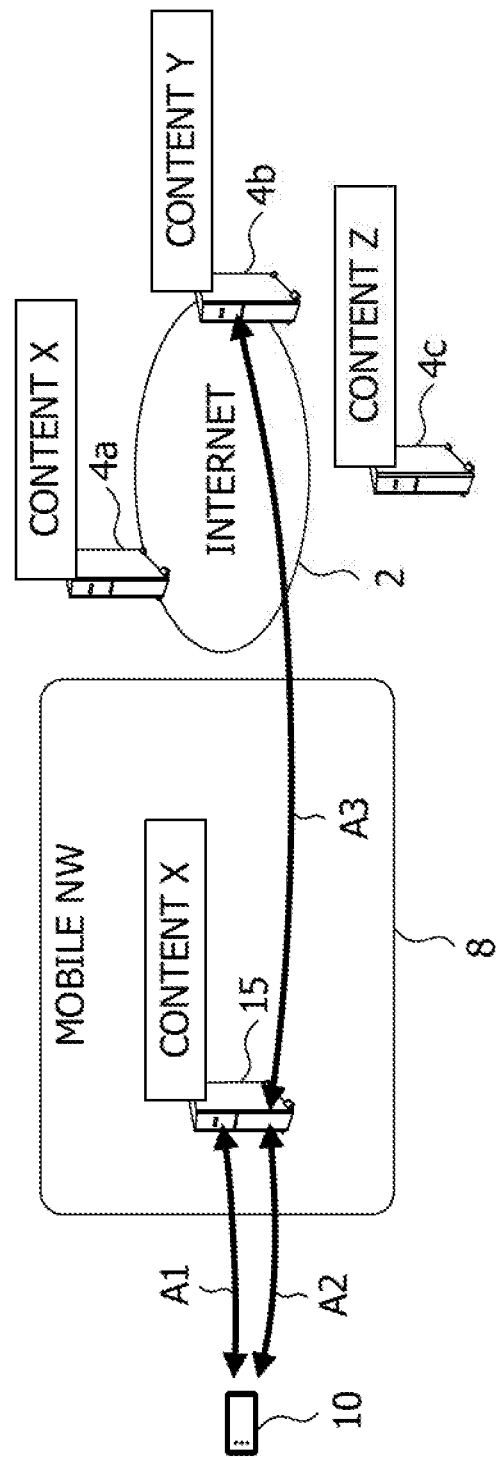
FIG. 2 is a diagram illustrating an example of a process of an MEC server.
Figure 3A:
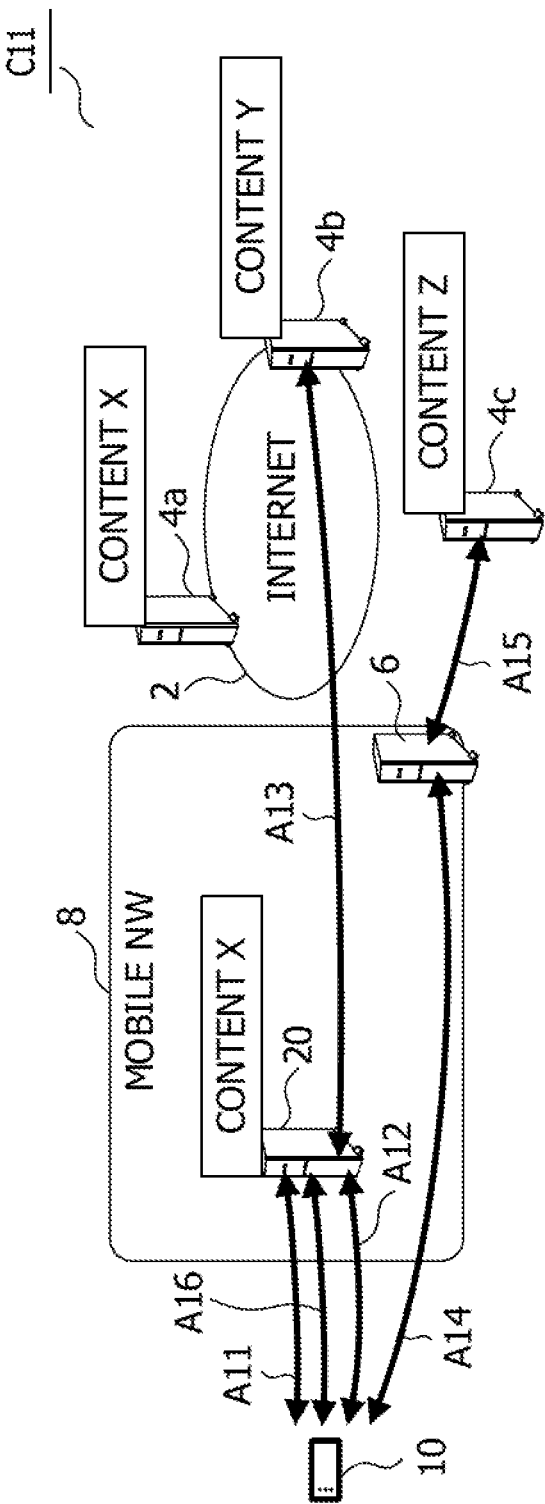

FIGS. 3A and 3B are diagrams illustrating an example of a communication process according to an embodiment. Case C11 of FIG. 3A indicates an example of a case in which the terminal 10 communicates with the servers 4 (4a to 4c) located outside of the mobile network 8 via one of the communication apparatus 20 or the EPC-GW 6 according to distribution of communication apparatus 20.

The communication apparatus 20 can perform domain name system (DNS) processing and relays communication between the terminal 10 and the server 4. When the terminal 10 acquires a uniform resource locator (URL) associated with content to be acquired, the terminal 10 inquires about the address of a server identified with a domain name in the acquired URL to the communication apparatus 20 (arrow A11). When the communication apparatus 20 receives the inquiry from the terminal 10, the communication apparatus 20 allocates a path to be used by the terminal 10 by determining an address to be notified of using a cache situation of inquiry target content and the number of requests.

The flowchart of FIG. 3B illustrates an example of a process executed by the communication apparatus 20. When the communication apparatus 20 receives the inquiry from the terminal 10, the communication apparatus 20 determines whether a caching process for content acquired from a server is validly set in the server identified with the inquired domain name (S1 and S2). Here, "the validity of the caching process" means that the caching process is executed on content obtained from the server. In a case in which an inquiry target domain name is associated with a server in which the caching process is not validly set, the communication apparatus 20 determines whether a frequency of inquiries about the domain name of the inquiry target exceeds a threshold (No in S2: S3). In a case in which the frequency of the inquiries about the domain name of the inquiry target does not exceed the threshold, the communication apparatus 20 determines that the number of requests for content provided from the server identified with the domain name which is the inquiry target is relatively small (No in S3). For example, it is assumed that the terminal 10 inquires about a domain name (dz) in a URL associated with content Z. In addition, it is assumed that the frequency of the inquiries about the domain name dz does not exceed the threshold. In this case, because of the inquiry about the domain name for which the frequency of the inquiries is low, even when the content acquired from the server 4c identified with the domain name dz is cached, there is a possibility that a terminal does not access the cached content afterwards. Accordingly, the communication apparatus 20 determines to suppress the communication apparatus 20 from relaying communication when the terminal 10 acquires the content by accessing the terminal 10 to the server 4 via the EPC-GW 6 (S4). Therefore, the communication apparatus 20 notifies the terminal 10 of a global internet protocol (IP) address allocated to the server 4c storing the content Z (arrow A11). When the communication apparatus 20 notifies the terminal 10 of the global IP address allocated to the server 4c, the terminal 10 access the server 4c via the EPC-GW 6 to acquire the content Z from the server 4c (arrows A14 and A15).

Conversely, it is assumed that the frequency of inquiries about the domain name included in the inquiry received in S1 exceeds the threshold. In this case, the frequency of inquiries to the communication apparatus 20 is relatively high. Therefore, the communication apparatus 20 determines that an inquiry about the domain name of the server 4 providing content for which there is a possibility of the caching process being valid is received (Yes in S3). Thus, the communication apparatus 20 changes of the valid setting of the caching process and determines to access the terminal 10 the server 4 via the communication apparatus 20 (S5). In this case, the communication apparatus 20 receives a request for acquiring content from the terminal 10. Then, the communication apparatus 20 accesses the server 4 retaining the content requested from the terminal 10 and acquires the content. Then, the communication apparatus 20 transmits the obtained content to the terminal 10. For example, in a case in which the process of S5 is executed in regard to the inquiry about the domain name with which the server 4b is identified, the communication apparatus 20 notifies the terminal 10 of a local IP address instead of the address of the server 4b (arrow A11). Here, the local IP address notified by the communication apparatus 20 is an address allocated to the communication apparatus 20. When the communication apparatus 20 notifies the terminal 10 of the local IP address, the terminal 10 transmits a request for content Y destined for the notified local IP address (destined for the communication apparatus 20) (arrow A12). When the communication apparatus 20 receives the request for acquiring the content Y, the communication apparatus 20 accesses the server 4b to acquires the content Y (arrow A13). The communication apparatus 20 caches the content Y and transmits the content Y to the terminal 10 (arrow A12).

Next, a case in which the caching process for content acquired from a server identified with the inquired domain name is validly set in the server will be described (Yes in S2). In the following description, it is assumed that the communication apparatus 20 caches the content X. In this case, there is a possibility that the communication apparatus 20 has content to be acquired by the terminal 10 in a cache retained by the communication apparatus 20. Therefore, the communication apparatus 20 accesses the terminal 10 to the communication apparatus 20 and determines to perform a process using data cached in the communication apparatus 20 (S6). Therefore, the communication apparatus 20 notifies the terminal 10 of the local IP address allocated to the communication apparatus 20 instead of the address of the server 4 identified with the domain name which is the inquiry target (arrow A11). The terminal 10 transmits a request for the content X destined for the notified local IP address (arrow A16). When the communication apparatus 20 receives the request for acquiring the content X, the communication apparatus 20 acquires the content X from cached information and transmits the content X to the terminal 10 (arrow A16). In a case in which the content requested from the terminal 10 is not included in the data cached in the communication apparatus 20, the communication apparatus 20 acquires the content and transmits the content to the terminal 10, as described with reference to the arrow A13 and the like.

In this way, the communication apparatus 20 determines whether to access the terminal 10 to the server 4 via the EPC-GW 6 without involving the communication apparatus 20 or access the terminal 10 to the communication apparatus 20 according to a cache situation or a previous inquiry history of the domain name. In the case in which the caching is validly set in S2, the frequency of inquiries exceeds the threshold. Therefore, it can also be said that the communication apparatus 20 notifies the local IP address in response to an inquiry about a domain name inquired a predetermined number of times or more. That is, according to whether a domain name is inquired the predetermined number of times or more, the communication apparatus 20 determines to notify the local IP address or the address of the server 4 identified with the inquired domain name.

In a case in which the terminal 10 is allowed to perform communication without involving the communication apparatus 20, the communication apparatus 20 notifies the terminal 10 of the address of the server 4 of a content storage destination. Therefore, the communication apparatus 20 can suppress a caching process for data for which there is a possibility of a use frequency being low. Further, a relay process for data which is not a caching process target can be suppressed. Therefore, a process load imposed on the communication apparatus 20 due to relay of data which is not a caching process target is reduced. In the foregoing example, the case in which the terminal 10 acquires the URL has been described as an example. However, the terminal 10 may acquire a uniform resource identifier (URI) instead of an URL. Further, the value of the frequency of the inquiries may be initialized for each predetermined period or may be decreased by a predetermined ratio so that correlation with a frequency of accesses is obtained.

Figure 4:
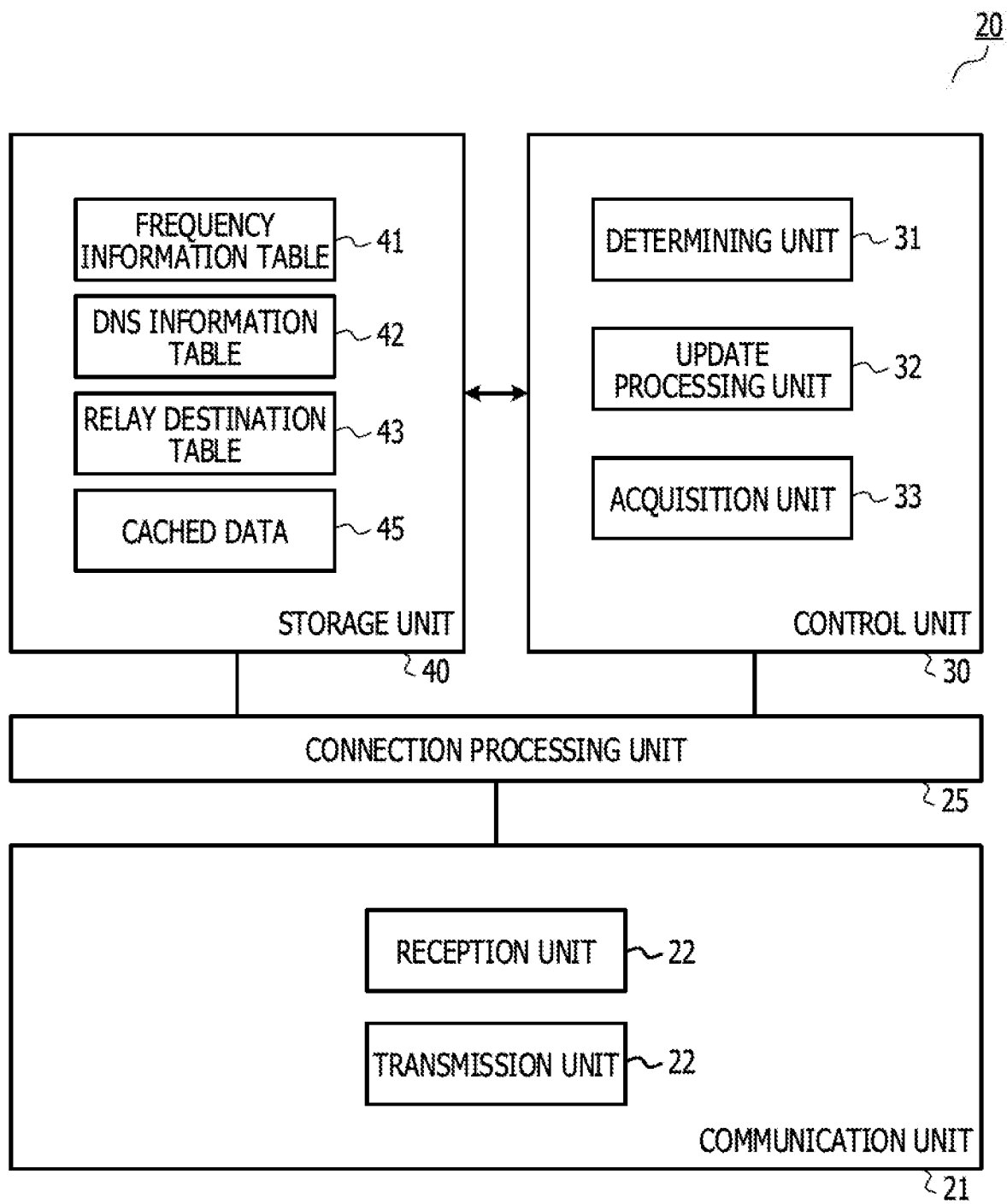
FIG. 4 is a diagram illustrating an example of a configuration of a communication apparatus.

FIG. 4 is a diagram illustrating an example of a configuration of the communication apparatus 20. The communication apparatus 20 includes a communication unit 21, a connection processing unit 25, a control unit 30, and a storage unit 40. The communication unit 21 includes a reception unit 22 and a transmission unit 23. The control unit 30 includes a determining unit 31, an update processing unit 32, and an acquisition unit 33. The storage unit 40 stores a frequency information table 41, a DNS information table 42, a relay destination table 43, and cache data 45. The communication apparatus 20 is, for example, an MEC server.

The frequency information table 41 stores the number of times a domain name is inquired for each inquiry target domain name. The DNS information table 42 stores information regarding an address of which the terminal 10 is notified for each inquiry target domain name. The relay destination table 43 is used to retain information regarding the terminal 10 to which acquired data is transmitted in a case in which the communication apparatus 20 accesses the server 4 as a proxy of the terminal 10 in order to acquire cache target data. The cache data 45 is cached data.

The reception unit 22 receives a packet from another apparatus such as the terminal 10 or the server 4. The transmission unit 23 transmits a packet to another apparatus such as the terminal 10 or the server 4. The connection processing unit 25 performs a process such as bearer setting between the terminal 10 and the communication apparatus 20.

The determining unit 31 determines an IP address in response to an inquiry about a domain name from the terminal 10. For example, in a case in which a caching process is validly set in the server 4 identified with the domain name, the determining unit 31 determines to notify the terminal 10 of the local IP address allocated to the communication apparatus 20. As a response to an inquiry of which the number of times exceeds the threshold in the frequency information table 41 and for which the caching process is not validly set, the determining unit 31 determines to notify the terminal 10 of the local IP address allocated to the communication apparatus 20. Conversely, as a response to an inquiry of which the number of times does not exceed the threshold and for which the caching process is not validly set, the determining unit 31 determines to notify the terminal 10 of the global IP address of the server 4 associated with the inquired domain name. The determining unit 31 appropriately refers to the DNS information table 42.

The update processing unit 32 performs a process of updating the frequency information table 41 and the DNS information table 42. The acquisition unit 33 acquires content from the server 4 as a proxy of the terminal 10 appropriately using the relay destination table 43. Then, the acquisition unit 33 transmits the acquired content to the terminal 10.

Figure 5:
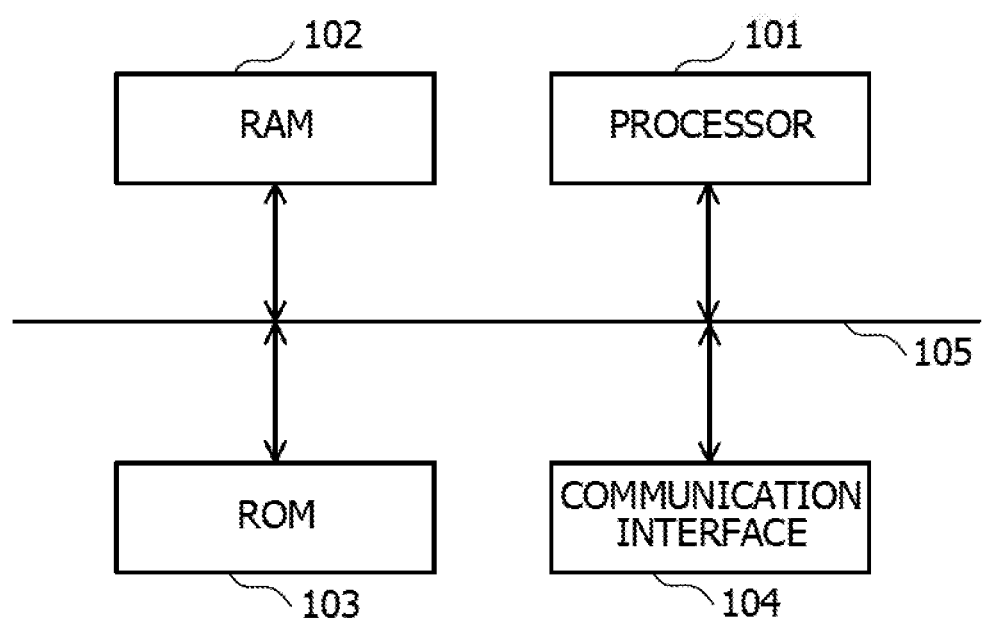
FIG. 5 is a diagram illustrating an example of a hardware configuration of the communication apparatus.

FIG. 5 is a diagram illustrating an example of a hardware configuration of the communication apparatus 20. The communication apparatus 20 includes a processor 101, a random access memory (RAM) 102, a read-only memory (ROM) 103, a communication interface 104, and a bus 105. The processor 101 is any processing circuit and is, for example, a central processing unit (CPU). The RAM 102 operates as a working memory of the processor 101. The processor 101 can execute a program stored in the ROM 103. The bus 105 connects the processor 101, the memory 102, the ROM 103, and the communication interface 104 to each other so that data can be mutually input and output. The communication interface 104 is any network connection device and performs inputting and outputting information to and from a network.

In the communication apparatus 20, the communication interface 104 operates as the communication unit 21. The processor 101 realizes the connection processing unit 25 and the control unit 30. Further, the RAM 102 and the ROM 103 operate as the storage unit 40.

First Embodiment

FIG. 6 is a diagram illustrating an example of a bearer used by the terminal 10. An example of a network and an example of a communication path used by the terminal 10 will be described with reference to FIG. 6. In the following description, the mobile network 8 includes the communication apparatus 20 and the EPC-GW 6. The terminal 10 can access an apparatus in the Internet 2 via one of the communication apparatus 20 and the EPC-GW 6. The terminal 10 uses a bearer B11 and a bearer B12. The bearer B11 is used for communication between the terminal 10 and the communication apparatus 20. The bearer B12 is used for communication between the terminal 10 and the EPC-GW 6.

The terminal 10 retains filter information T1 in advance. The filter information T1 is used to distribute a transmission target packet to any one of the bearers which can be used by the terminal 10. The filter information T1 is information used to associate a bearer ID with filter information. The bearer ID is identification used to identify a bearer which can be used by the terminal 10. The filter information is a condition that a bearer specified with a bearer ID in entries is used. In the example of FIG. 6, a destination IP address and an IP address mask are set as filter information in the bearer B11 used to communicate with the communication apparatus 20. The terminal 10 uses the bearer B11 for transmission of a packet destined for an address of a network specified from a combination of a destination IP address and an IP address mask. Here, in the network specified from the combination of the destination IP address and the IP address mask, the communication apparatus 20 sets the terminal 10 communicating with the communication apparatus 20 in a range of local IP addresses which can be designated as a communication destination. For example, a local IP address which can be used by the communication apparatus 20 is in a range from 192.168.0.0 to 192.168.255.255. In this case, as indicated in the filter information T1, the destination IP address is set to 192.168.0.1 and the IP address mask is set to 255.255.0.0. The terminal 10 uses the combination of the destination IP address and the IP address mask and uses the bearer B11 in a case in which the destination address is in the range from 192.168.0.0 to 192.168.255.255.

On the other hand, no filter information is set in the bearer B12 used to communicate with the EPC-GW 6. Therefore, the terminal 10 sets the bearer B12 as a default bearer and transmits a packet not matched with the filter information of the bearer B11 via the bearer B12.

The terminal 10 retains the filter information T1, and thus a packet in which the local IP address allocated to the communication apparatus 20 is a destination is transmitted using the bearer B11. Accordingly, in a case in which an address notified of by the communication apparatus 20 is the local IP address allocated to the communication apparatus 20, a request for acquiring content is transmitted to the communication apparatus 20. In a case in the request for acquiring the content is transmitted using the bearer B11, the communication apparatus 20 accesses the server 4 in the Internet 2 and acquires content. Then, the communication apparatus 20 relays the obtained content to the terminal 10. On the other hand, a packet not matched with the filter information of the bearer B11, such as the packet in which the global IP address is a destination, is transmitted to the EPC-GW 6 via the bearer B12.

FIG. 6 illustrates the filter information and setting examples of the bearers in one terminal 10. However, any number of terminals 10 which communicate with the server 4 via the communication apparatus 20 or the EPC-GW 6 can be used. Accordingly, the terminals 10 transmitting inquiries to the communication apparatus 20 may be different for certain domain names. A certain terminal may inquire the same domain name to the communication apparatus 20 in a plurality of times.

Hereinafter, a process before the number of accesses exceeding a threshold occurs, a process at the time of starting use of a cache, a process on cached data, and a process on data which is not temporarily stored will be described separately in the first embodiment.

(1) Process Before Number of Accesses Exceeding Threshold Occurs

An example of a process of the communication apparatus 20 at the time of first inquiry about a certain domain will be described with reference to FIG. 7. When the terminal 10 acquires a URI of content to be acquired, the terminal 10 inquires an address of an access destination to the communication apparatus 20 using a domain name included in the URI (S11).

The reception unit 22 of the communication apparatus 20 receives the inquiry. The determining unit 31 retrieves the frequency information table 41 using the domain name included in the inquiry as a key. At the time of the first inquiry, an entry associated with the domain name inquired from the terminal 10 is not included in the frequency information table 41. Accordingly, the update processing unit 32 generates an entry related to a newly inquired domain name in the frequency information table 41.

For example, it is assumed that the communication apparatus 20 receives the first inquiry about a domain name xxx.xxx.xxx. In this case, the update processing unit 32 adds entries indicated in a frequency information table 41_1 to the frequency information table 41. The frequency information table 41 stores the number of inquiries and cache setting for each domain name. The cache setting is information indicating that information acquired from the server 4 identified with a domain name of the entry is set to a cache target. The cache setting is set according to a frequency of inquiries or the like. In the example of the frequency information table 41_1, the number of inquiries about the domain name xxx.xxx.xxx is 1. In this case, since the number of inquiries does not reach the threshold, the update processing unit 32 sets the cache setting to "invalid".

The determining unit 31 retrieves the DNS information table 42 using an inquiry target domain name as a key to acquire a notification target IP address. In the DNS information table 42, kinds of a global IP address and a response IP address are registered in association with a domain name. The global IP address is a global IP address allocated to the server 4 identified with the domain name. The kind of a response IP address is a kind of address of which the communication apparatus 20 notifies the terminal 10 which is an inquiry source.

In a case in which an entry of the inquired domain name is not present in the DNS information table 42, the update processing unit 32 acquires the address of the server identified with the inquired domain name from another DNS server in the Internet 2. The update processing unit 32 adds an entry of a process target domain to the DNS information table 42 and stores the acquired address as a global IP address of the server identified with the domain name in the newly added entry. Further, the update processing unit 32 sets a kind of response IP address as a global IP address in the newly added entry.

The DNS information table 42_1 is an example of an entry generated in regard to the domain name xxx.xxx.xxx. In the example of the DNS information table 42_1, the global IP address of the server 4 identified with the domain name xxx.xxx.xxx is X.

When the entry in regard to the domain name xxx.xxx.xxx is added to the DNS information table 42_1, the determining unit 31 determines an address to be responded according to the setting of the added entry. As indicated in the DNS information table 42_1, in a case in which a kind of address to be responded is set to the global IP address, the determining unit 31 acquires the global IP address X associated with the inquired domain name as a notification target. The determining unit 31 notifies the terminal 10 of the acquired address X via the transmission unit 23 (S12).

When the terminal 10 is notified of the global IP address X by the communication apparatus 20, the terminal 10 generates a content request designated for the notified address. The terminal 10 transmits the content request (S13). Here, the terminal 10 determines a bearer to be used to transmit the content request using the filter information (T1 in FIG. 6). The destination of the content request is not matched with the condition that the bearer B11 is used because of the global IP address X. Accordingly, the terminal 10 transmits the content request using the bearer B12. Therefore, the content request is transmitted to the server 4 via the EPC-GW 6 and is not transmitted through the communication apparatus 20.

The server 4 receiving the content request transmits the requested content to the terminal 10 (S14). At this time, the terminal 10 transmits the content from the server 4 via the EPC-GW 6. Accordingly, downloaded data is not transmitted through the communication apparatus 20.

Next, an inquiry about the domain name xxx.xxx.xxx to the communication apparatus 20 occurs in another terminal 10 or the like in the network. When the inquiry about the domain name xxx.xxx.xxx occurs, the update processing unit 32 increases the number of inquiries in the entry of the domain name xxx.xxx.xxx by 1 in the frequency information table 41. At that time, it is assumed that the number of inquiries does not exceed the threshold. Then, the determining unit 31 notifies the terminal 10 having inquired the domain name of the global IP address X using the DNS information table 42_1.

Here, even in a domain in which the number of inquiries in the frequency information table 41 is increased merely according to the occurrence of an inquiry and the frequency of inquiries is low, there is a possibility of a sum of the number of inquiries for a long time exceeding the threshold. Accordingly, the update processing unit 32 performs a process of decreasing the number of inquiries in parallel over time to correctly determine the frequency of inquiries by comparing the threshold with the number of inquiries. For example, the update processing unit 32 can performs the process of decreasing the number of inquiries using the following equation:

$$N(T+t) = \alpha \times N(T),$$

where $N(T)$ is the number of inquiries at a time T. Here, t is a time interval at which the decreasing process is executed. Further, $\alpha$ is a constant from −1 to 0.

The threshold used for the comparison to the number of inquiries and the constant in the calculation equation at the time of decreasing the number of inquiries according to the elapse of the time can be changed according to mounting. For example, these values may be adjusted according to a capacity for storing the cache data 45 in the storage unit 40 or a capacity of data stored as the cache data 45 at the time of a process.

(2) Starting Use of Cache

FIG. 8 is a diagram illustrating an update example of a table when the number of inquiries exceeds the threshold. Until access of the number of inquiries exceeding the threshold occurs, the process described with reference to FIG. 7 is changed. As a result, in the stage of FIG. 8, it is assumed that an inquiry about the domain name xxx.xxx.xxx is performed A times, as indicated in a frequency information table 41_2. Here, it is assumed that a threshold in which the communication apparatus 20 starts storing in the cache data 45 is A. Accordingly, until the number of inquiries exceeds the threshold A, the cache process is not executed. That is, at a time point at which the frequency information table 41_2 is used, data obtained from the server 4 identified with the domain name xxx.xxx.xxx is not included in cache data 45_1.

Thereafter, the address of the server 4 identified with the domain name xxx.xxx.xxx is inquired from the terminal 10. Then, the update processing unit 32 updates the threshold to A+1 by increasing the number of inquiries associated with the domain name xxx.xxx.xxx by 1. The update processing unit 32 updates the cache setting to "valid" since the number of inquiries exceeds the threshold A. Through this process, the frequency information table 41_2 is updated to frequency information table 41_3. Further, the update processing unit 32 updates the kind of response IP address to the local IP address in the DNS information table 42 since the cache setting is updated to "valid". Therefore, the DNS information table 42_1 is updated to DNS information table 42_3, as indicated.

Referring to the updated DNS information table 42_3, the determining unit 31 recognizes that the terminal 10 which is an inquiry source is notified of the local IP address as the address of the server 4 identified with the domain name xxx.xxx.xxx. The determining unit 31 determines the local IP address to be notified of in advance among the local IP addresses set as addresses processed by the communication apparatus 20 and notifies the terminal 10 of the determined address via the transmission unit 23.

Since the terminal 10 transmits the content request destined for the notified address, the terminal 10 accesses the server 4 via the communication apparatus 20. Then, the communication apparatus 20 stores the content acquired from the server 4 as the cache data 45 in association with a cache key such as a URI of the content. Therefore, the cache data 45_1 is updated to a state of cache data 45_2. Details of a process when the terminal 10 acquires information of the server 4 via the communication apparatus 20 will be described with reference to FIGS. 9 to 11.

FIG. 9 is a diagram illustrating an example of a content request and a relay destination table 43. F1 in FIG. 9 indicates a format of a content request. The content request includes a URI and data associated with a transmission source IP address, a destination IP address, a transmission source port number, a destination port number, and content. The URI associated with content includes the domain name of the server 4 storing acquisition target data and a path indicating a storage destination of the acquisition target data. The format of the content request is the same between both the content request transmitted from the terminal 10 to the communication apparatus 20 and the content request transmitted from the communication apparatus 20 to the server 4. The content request does not include data.

The relay destination table 43 is used when the communication apparatus 20 associates the terminal 10 which is the transmission source of the content request as a transmission destination of data acquired from the server 4. The relay destination table 43 includes the IP address of the terminal 10, a port number designated as a transmission source by the terminal 10 (terminal port number), the IP address of the communication apparatus 20, and a port number of the communication apparatus 20. The IP address of the communication apparatus 20 is an address designated by the terminal 10 as a destination of the content request. The IP address of the communication apparatus 20 is a local IP address of which the communication apparatus 20 notifies the terminal 10 through the process described with reference to FIG. 8. The port number of the communication apparatus 20 is set by the acquisition unit 33 at the time of a process of the content request.

For example, through the process described with reference to FIG. 8, it is assumed that the terminal 10 is notified of a local IP address BBB in response to an address inquiry from the terminal 10. In this case, the terminal 10 generates a content request including information indicated in F2. In the example of F2, an IP address AAA of the terminal 10 is used as a transmission source address and a port number aaa of the terminal 10 is used as a transmission source port number. Further, the local IP address BBB of which the communication apparatus 20 notifies the terminal 10 is set as the destination address. The destination port number is set as a value used in the server 4 to transmit and receive content. In the example of F2, the destination port number is set to PoX. Further, the URI of content is assumed to be URIa. The terminal 10 transmits a content request indicated in F2 via the bearer B11 (FIG. 6). Therefore, the communication apparatus 20 receives the content request indicated in F2.

When the reception unit 22 of the communication apparatus 20 receives the content request, the reception unit 22 outputs the content request to the acquisition unit 33. The acquisition unit 33 stores the following information in the relay destination table 43 using the received content request:
the terminal IP address: AAA;
the terminal port number: aaa; and
the IP address of the communication apparatus 20: BBB.

Further, the acquisition unit 33 generates a content request to be transmitted to the server 4 to acquire content requested through communication specified with a combination of the terminal IP address and the terminal port number stored in the relay destination table 43. At this time, the acquisition unit 33 generates a value with which the combination of the terminal IP address and the terminal port number can be uniquely specified as a transmission source port number. The acquisition unit 33 stores the generated transmission source port number as a port number of the communication apparatus 20 in the relay destination table 43. When bbb is determined as the transmission source port number, the acquisition unit 33 updates the relay destination table 43 as follows:
the terminal IP address: AAA;
the terminal port number: aaa;
the IP address of the communication apparatus 20: BBB; and
the port number of the communication apparatus 20: bbb.

Here, it is assumed to a packet indicated in F3 is generated as a content request destined for the server 4. In the content request indicated in F3, an IP address (IPb) used for the communication apparatus 20 to communicate with an apparatus in the Internet 2 is used as a transmission source address. The transmission source port number is set to bbb to identify the combination of the terminal IP address and the terminal port number. The destination address is a global IP address allocated to the server 4 that retains the acquisition target content. The acquisition unit 33 retrieves the DNS information table 42 using the domain name included in the URI indicated in the content request of F2 as a key. Thus, the acquisition unit 33 acquires the global IP address associated with the domain name used as the key. Here, since the URI in the content request indicated in F2 includes the domain name xxx.xxx.xxx, the acquisition unit 33 is assumed to acquire X as the global IP address referring to the DNS information table 42_3 (FIG. 8). The acquisition unit 33 uses a value in the content request of F2 transmitted from the terminal 10 in regard to the destination port number and the URI of the content.

FIG. 10 is a diagram illustrating an example of a communication process when the number of inquiries exceeds the threshold. It is assumed that the number of inquiries about the domain name exceeds the threshold A, as described with reference to FIG. 8, when the inquiry transmitted in S21 is performed. Then, the communication apparatus 20 notifies the terminal 10 of the local IP address BBB as the IP address corresponding to the domain name which is the inquiry target in S21 (S22). The terminal 10 transmits a content request to an apparatus destined for the address (BBB) notified of in S22 (S23). The content request transmitted in S23 is assumed to be the content request indicated in F2 of FIG. 9. Then, to acquire the content requested from the terminal 10, the acquisition unit 33 of the communication apparatus 20 generates the content request indicated in F3 of FIG. 9 and transmits the content request to the server 4 (S24).

When the server 4 receives the content request, the server 4 generates a response including the content designated with the URI in the received content request. In the response, data of the content to be transmitted and the URI of the content are stored in association therewith. The server 4 transmits the response to the communication apparatus 20 (S25). In the response transmitted in S25, the global IP address allocated to the communication apparatus 20 is designated as a destination. The details of the response will be described with reference to FIG. 11.

When the reception unit 22 of the communication apparatus 20 receives the response, the reception unit 22 outputs the response to the acquisition unit 33. The acquisition unit 33 stores a combination of the URI and the data in the response as the cache data 45 in the storage unit 40. Further, the acquisition unit 33 specifies the address and the port number of the terminal 10 using the relay destination table 43 and generates a response destined for the terminal 10. The transmission unit 23 transmits the response to the terminal 10 (S26). In S26, the local IP address which is a destination of the request of S23 is used as the transmission source IP address.

FIG. 11 is a diagram illustrating an example of a response. Hereinafter, a specific example of the processes in S25 and S26 of FIG. 10 will be described. The relay destination table 43 and the format of the response (F1 of FIG. 9) illustrated in FIG. 11 are the same as those of FIG. 9 and are illustrated in FIG. 11 to easily view the drawing.

In S25, it is assumed that a packet having a format indicated in F11 is transmitted from the server 4. In this case, the global IP address (X) allocated to the server 4 retaining the acquisition target content as the transmission source address is set in a response indicated in F11. Further, a transmission source port number is a port number (PoX) used for the server 4 to transmit and receive content. Since the transmission source address of the content request indicated in F3 (FIG. 9) is set as the destination address, an IP address (IPb) used for the communication apparatus 20 to communicate with an apparatus in the Internet 2 is set. Similarly, since the transmission source port number of the content request indicated in F3 (FIG. 9) is set as the destination port number, bbb is set.

When the acquisition unit 33 acquires the response indicated in F11, the acquisition unit 33 refers to the relay destination table 43. The acquisition unit 33 specifies the transmission destination of data in the response by retrieving the relay destination table 43 using the destination port number of the response indicated in F11 as a key. In the example of FIG. 11, since the destination port number of the response is bbb, information indicating the terminal IP address=AAA and the terminal port number=aaa can be obtained as a data transmission destination. Next, the acquisition unit 33 generates a response indicated in F12 to transmit the data. In the response indicated in F12, the acquisition unit 33 sets the terminal IP address=AAA specified in the relay destination table 43 as the destination address. The acquisition unit 33 sets the terminal IP address=aaa specified in the relay destination table 43 as the destination port number. Further, the acquisition unit 33 also specifies the local IP address used to communicate with the terminal 10 which is the destination from the relay destination table 43. In the example of FIG. 11, since the destination port number of the response received by the communication apparatus 20 is bbb, the IP address of the communication apparatus 20 used to communicate with the terminal 10 is BBB. The acquisition unit 33 sets the specified address as the transmission source address. Therefore, a packet transmitted to the terminal 10 in S26 is indicated in F12.

When the response indicated in F12 is acquired, the terminal 10 processes the response as a response to the content request transmitted by the terminal 10. Therefore, data in the response indicated in F12 is acquired by the terminal 10.

(3) Process on Cached Data

Figure 12:
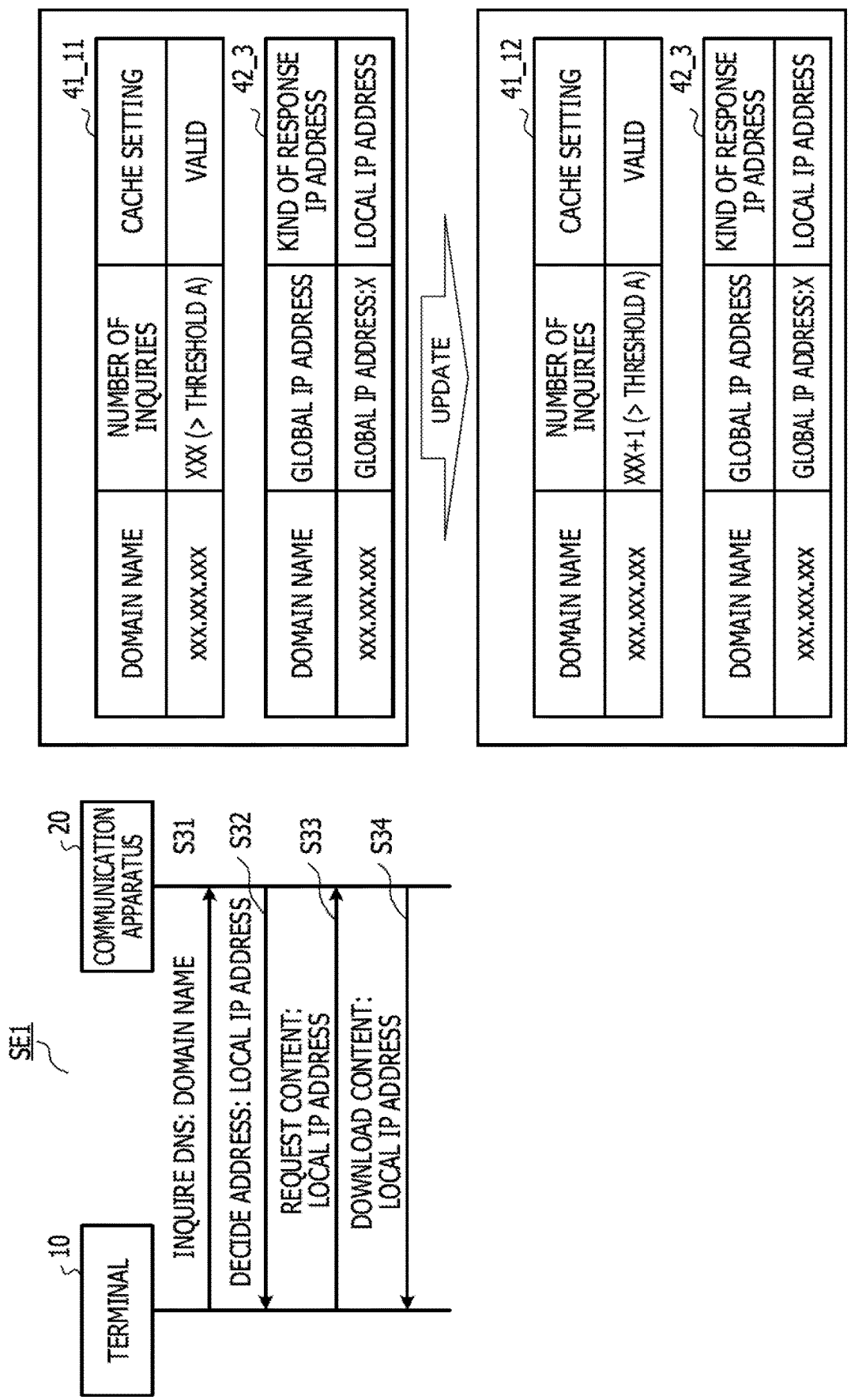
FIG. 12 is a diagram illustrating an example of a process in a case in which cached information is requested.

FIG. 12 is a diagram illustrating an example of a process in a case in which cached information is requested. It is assumed that even after the processes described with reference to FIGS. 8 to 11, the address of the server 4 identified with the domain name xxx.xxx.xxx is further inquired, and therefore the number of inquiries about the domain is XXX times. In this case, the communication apparatus 20 includes a frequency information table 41_11. Here, XXX is a value greater than the threshold A. At a time point after FIG. 8, the communication apparatus 20 includes a DNS information table 42_3.

It is assumed that the number of inquiries about the domain name of an inquiry target is XXX+1 times when an inquiry transmitted in S31 is performed. Then, the update processing unit 32 updates the frequency information table 41_11 to a frequency information table 41_12 by increasing the number of inquiries. Referring to the DNS information table 42_3, the determining unit 31 specifies that the kind of the response IP address associated with the inquiry target domain name is set to the local IP address. Then, the determining unit 31 determines one of the local IP address allocated to the communication apparatus 20 as a target of which the terminal 10 is notified. The determining unit 31 notifies the terminal 10 of the determined local IP address via the transmission unit 23 (S32).

The terminal 10 transmits a content request to the communication apparatus 20 by performing the processes described with reference to FIGS. 9 and 10 and the like (S33). When the acquisition unit 33 of the communication apparatus 20 acquires the content request via the reception unit 22, the acquisition unit 33 determines whether data associated with the URI included in the content request is included in the cache data 45. In a case in which the data associated with the URI included in the content request is included in the cache data 45, the acquisition unit 33 extracts the data associated with the URI in the content request as data to be transmitted to the terminal 10. The acquisition unit 33 generates a response including the extracted data. In the response generated at this time, the local IP address designated as the destination of the content request received in S33 is set as the transmission source address. The acquisition unit 33 transmits the response to the terminal 10 via the transmission unit 23 (S34). When the terminal 10 receives the response, the terminal 10 performs a process using the data in the received response as data of the requested content.

In the foregoing process, the example in regard to one domain has been described to facilitate understanding, but any number of domains which are inquiry targets to the communication apparatus 20 is used. Further, the terminal 10 performing the content request or the inquiry to the communication apparatus 20 and the terminal 10 previously performing the content request or the inquiry to the communication apparatus 20 may be the same as each other or may be different from each other.

(4) Process on Data which is not Temporarily Stored

FIG. 13 is a diagram illustrating an example of a process on data which is not a cache target. It is assumed that the number of inquiries about an entry of a domain name zzz.zzz.zzz exceeds the threshold. Then, through the same processes as the processes described with reference to FIGS. 8 to 12 and the like, access to the server 4 identified with the domain name zzz.zzz.zzz is performed via the communication apparatus 20. When the acquisition unit 33 acquires a response from the server 4, it is assumed that information indicating that content included in the response is data which is not a target temporarily stored as the cache data 45 is detected. An example of the information indicating the content is the data which is not the temporarily stored target includes destination of "no-cache" in a tag in the content. In a case in which hypertext markup language (HTML) is used, setting of a cache such as <meta http-equiv="Cache-Control" content="no-cache"> in header information of the content can also be used to indicate the data is not the temporarily stored target. This information is set by the server 4, for example, in a case in which a content update frequency is high. The acquisition unit 33 determines that the content set in this way is the content which is not the target temporarily stored as the cache data 45.

When the content which is not the target temporarily stored as the cache data 45 is detected, the acquisition unit 33 sets cache setting to "target exclusion" in regard to a domain name included in an URI of the content. The content stored in the server identified with the domain name in which the cache setting is set to "target exclusion" includes data not cached due to a reason such as high an update frequency. Therefore, it is subsequently preferable to perform communication without involving the communication apparatus 20. Accordingly, the acquisition unit 33 sets a value of the number of inquiries as an invalid value in an entry of a domain name in which the cache setting is set to "target exclusion", as illustrated in FIG. 13. Further, the acquisition unit 33 changes the setting of the kind of the response IP address of an inquiry about the domain name in which the cache setting is set to "target exclusion" to the global IP address in the DNS information table 42.

Even when the inquiry about the domain name zzz.zzz.zzz to the communication apparatus 20 is performed through this process, the update processing unit 32 does not update the number of inquiries since the number of inquiries is the invalid value. Further, the determining unit 31 determines to notify of a global IP address (Z) of the server 4 identified with the domain name zzz.zzz.zzz using the DNS information table 42 in response to the inquiry about the domain name zzz.zzz.zzz.

The frequency information table 41 of FIG. 13 indicates an example of a case in which information regarding a plurality of domains is recorded. In an entry of the domain name xxx.xxx.xxx, a cache is validly set. That is, information downloaded from the server 4 identified with the domain name xxx.xxx.xxx is stored as the cache data 45 in the communication apparatus 20.

In an entry of a domain name yyy.yyy.yyy, a cache is set to be invalid since the number of inquiries YYY is less than the threshold A. Therefore, in a case in which an inquiry about the domain name yyy.yyy.yyy is performed, a transmission source of the inquiry is notified of the global IP address (Y) of the server 4 identified with the domain name yyy.yyy.yyy based on the DNS information table 42 of FIG. 13. Accordingly, communication between the terminal 10 and the server 4 identified with the domain name yyy.yyy.yyy is performed without involving the communication apparatus 20.

(5) Process Flow

Hereinafter, an example of a process executed by the communication apparatus 20 or the terminal 10 will be organized with reference to a flowchart.

Figure 14:
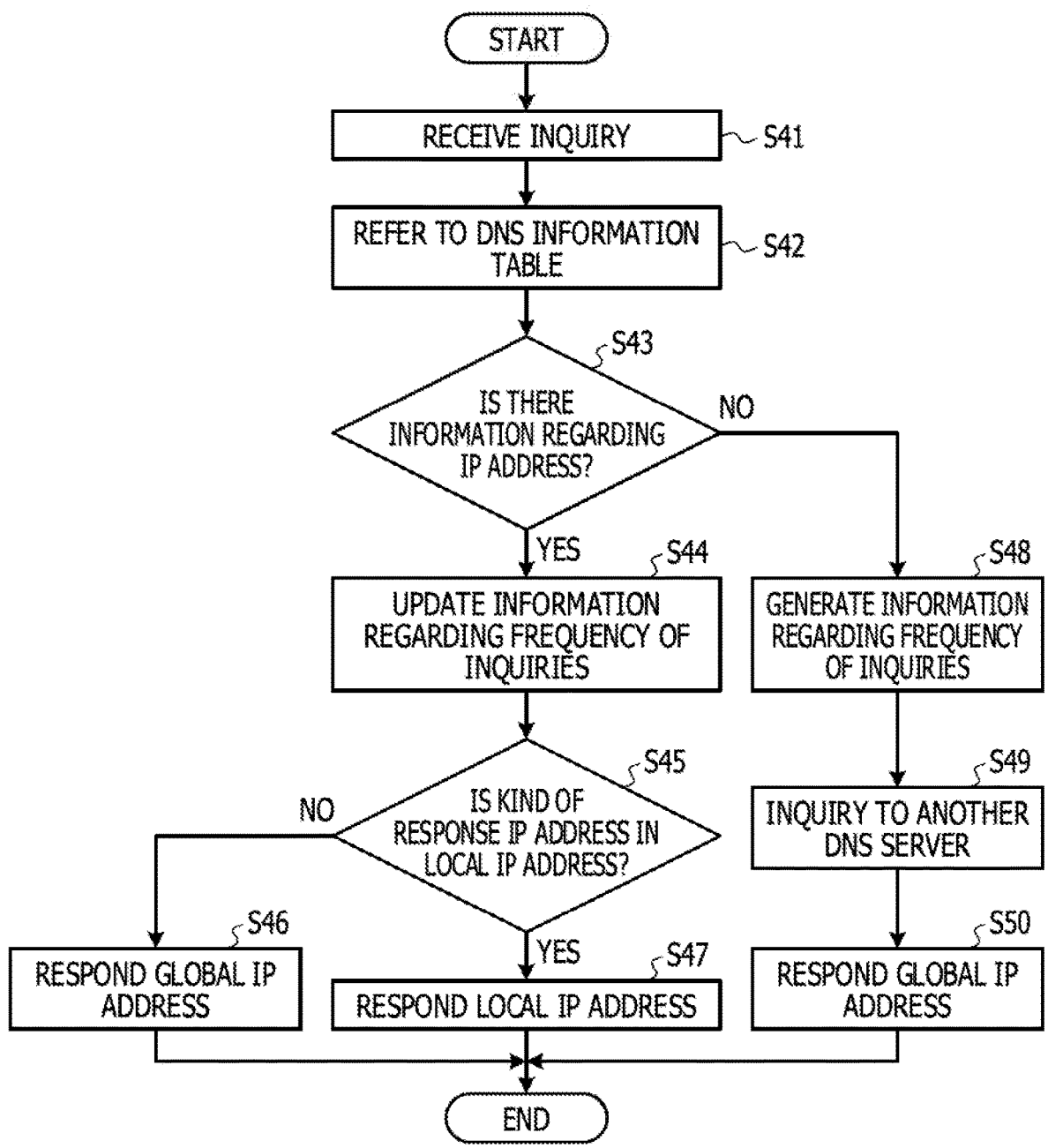
FIG. 14 is a flowchart illustrating an example of a process by a communication apparatus.

FIG. 14 is a flowchart illustrating an example of a process by the communication apparatus 20 when an inquiry of a domain name is received. FIG. 14 illustrates an example of the process and the process can be changed according to mounting. For example, the procedure of S48 and S49 can be interchanged. The reception unit 22 receives an inquiry (S41). The determining unit 31 refers to the DNS information table 42 (S42). The determining unit 31 determines whether information regarding an IP address in regard to an inquiry target domain name is included in the DNS information table 42 (S43).

In a case in which the information regarding the IP address in regard to the inquiry target domain name is included in the DNS information table 42, the update processing unit 32 updates information regarding the frequency of inquiries (Yes in S43: S44). The determining unit 31 determines whether a kind of response IP address associated with the inquiry target domain name is set to a local IP address in the DNS information table 42 (S45). In a case in which a kind of response IP address is not set to the local IP address, the determining unit 31 includes a global IP address allocated to the server 4 identified with the inquiry target domain name in a response (S46). Conversely, in a case in which the kind of response IP address is set to the local IP address, the determining unit 31 includes the local IP address selected in a range of the local IP address allocated to the communication apparatus 20 in the response.

In a case in which the information regarding the IP address in regard to the inquiry target domain name is not included in the DNS information table 42, the update processing unit 32 generates information regarding the frequency of inquiries in regard to the domain in the frequency information table 41 (No in S43: S48). Further, the determining unit 31 inquiries about the IP address in regard to the inquiry target domain name to another DNS server in the Internet 2 (S49). When the IP address in regard to the inquiry target domain name can be obtained from the other DNS server, the determining unit 31 records the obtained information in the DNS information table 42. Further, the determining unit 31 includes the obtained global IP address in a response to the inquiry (S50).

Figure 15:
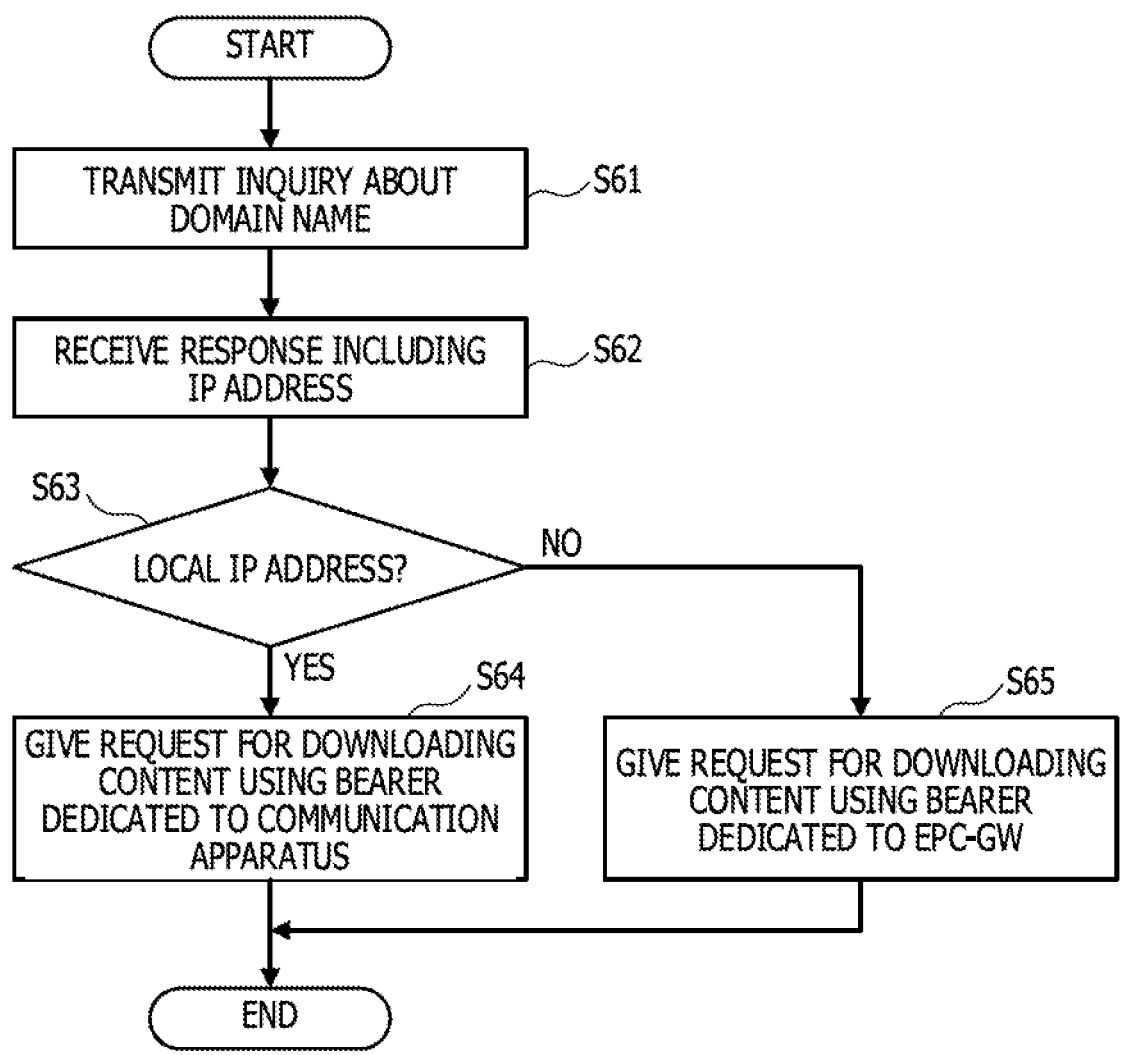
FIG. 15 is a flowchart illustrating an example of a process by the terminal.

FIG. 15 is a flowchart illustrating an example of a process by the terminal 10. The terminal 10 transmits an inquiry about the domain name included in an acquisition target URI to the communication apparatus 20 (S61). The terminal 10 receives a response including the IP address (S62). The terminal 10 determines whether an address notified as the response is a local IP address (S63). In a case in which the address notified as the response is the local IP address, the terminal 10 makes a request for downloading content using a bearer dedicated to the communication apparatus 20 (Yes in S63: S64). In a case in which the address notified as the response is not the local IP address, the terminal 10 makes a request for downloading content using a bearer dedicated to the EPC-GW 6 (No in S63: S65).

Figure 16:
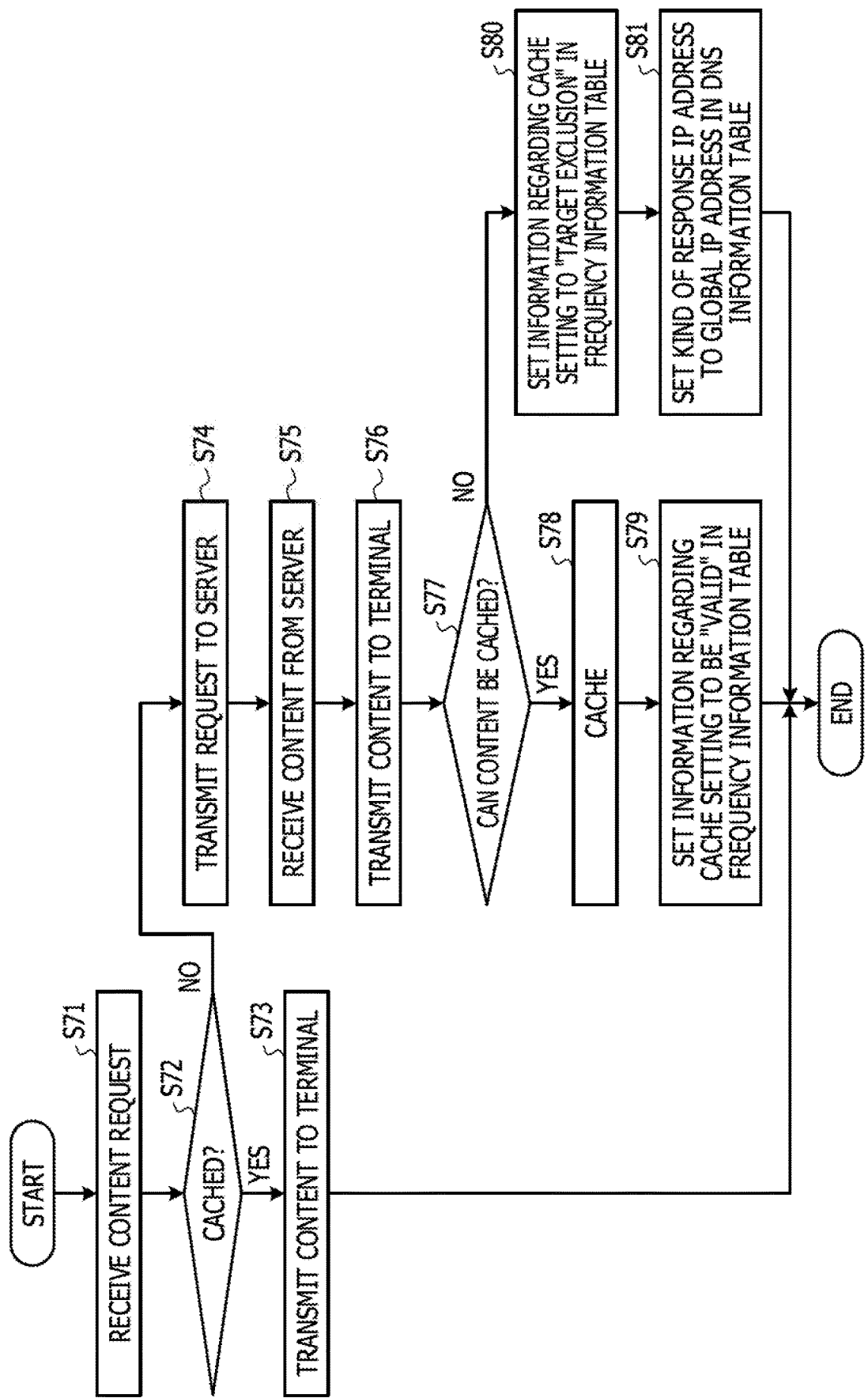
FIG. 16 is a flowchart illustrating an example of a process by the communication apparatus.

FIG. 16 is a flowchart illustrating an example of a process by the communication apparatus 20 when a content request is received. FIG. 16 illustrates an example of the process and the process can be changed according to mounting. For example, S76 may be executed after the process of S77. A change timing of the cache setting may be performed before S74, as described with reference to FIG. 8.

When a content request is received, the acquisition unit 33 determines whether the requested content is included in the cache data 45 (S71 and S72). In a case in which the requested content is included in the cache data 45, the acquisition unit 33 transmits content extracted from the cache data 45 to the terminal 10 (Yes in S72: S73).

Conversely, in a case in which the requested content is not included in the cache data 45, the acquisition unit 33 transmits the content request to the server 4 (No in S72: S74). The reception unit 22 receives a response including the content from the server 4 (S75). The acquisition unit 33 transmits the content to the terminal 10 via the transmission unit 23 (S76). The acquisition unit 33 determines whether the acquired content is content which can be cached (S77). In a case in which the content is the content which can be cached, the acquisition unit 33 caches the acquired content as the cache data 45 along with an URI serving as a cache key (Yes in S77: S78). Further, the acquisition unit 33 sets information regarding the cache setting to be valid in the frequency information table 41 (S79).

In a case in which the content is not the content which can be cashed, the acquisition unit 33 sets the information regarding the cache setting to "target exclusion" in the frequency information table 41 (No in S77: S80). Further, the acquisition unit 33 sets the kind of response IP address to the global IP address in the DNS information table 42 (S81).

As described above, according to the first embodiment, the communication apparatus 20 determines the address of which the terminal 10 is notified as the IP address associated with the domain name according to an inquiry situation about the inquiry target domain name or setting of whether the caching is performed. For example, there is a low possibility that the content in the cache data is used even when the content retained by the server 4 identified with the domain name of which the frequency of the inquiries is low is cached. For such data, there is a high possibility that a caching process in the communication apparatus 20 or a process such as transmission of data may be a useless process. Accordingly, for the terminal 10 to communicate with the server 4 via the EPC-GW 6, the communication apparatus 20 notifies the terminal 10 of the address of the server 4 which is a storage destination of content. When the terminal 10 communicates with the server 4 via the EPC-GW 6, a process load imposed on the communication apparatus 20, such as relay of communication between the terminal 10 and the server 4 or caching of the obtained content, is reduced. Further, for a domain including non-target content which is stored as the cache data 45, the communication apparatus 20 causes content to be acquired without involving the communication apparatus 20 by notifying the terminal 10 of the address of the server 4 which is the storage destination of the content. Therefore, a process load on the communication apparatus 20 is reduced.

On the other hand, content acquired from the server 4 identified with the domain name which is inquired many times is subjected to a caching process by the communication apparatus 20. Therefore, when the terminal 10 acquires the data cached in the communication apparatus 20, the terminal 10 can acquire data from the communication apparatus 20. Therefore, there is the advantage that communication is not performed outside of the mobile network 8. Further, for the data cached in the communication apparatus 20, content is supplied from the communication apparatus 20 to the terminal 10. Therefore, content for which the number of accesses is large is subjected to a low delaying process.

Second Embodiment

In a second embodiment, an example of a communication system capable of performing the same process as the communication apparatus 20 will be described.

Figure 17:
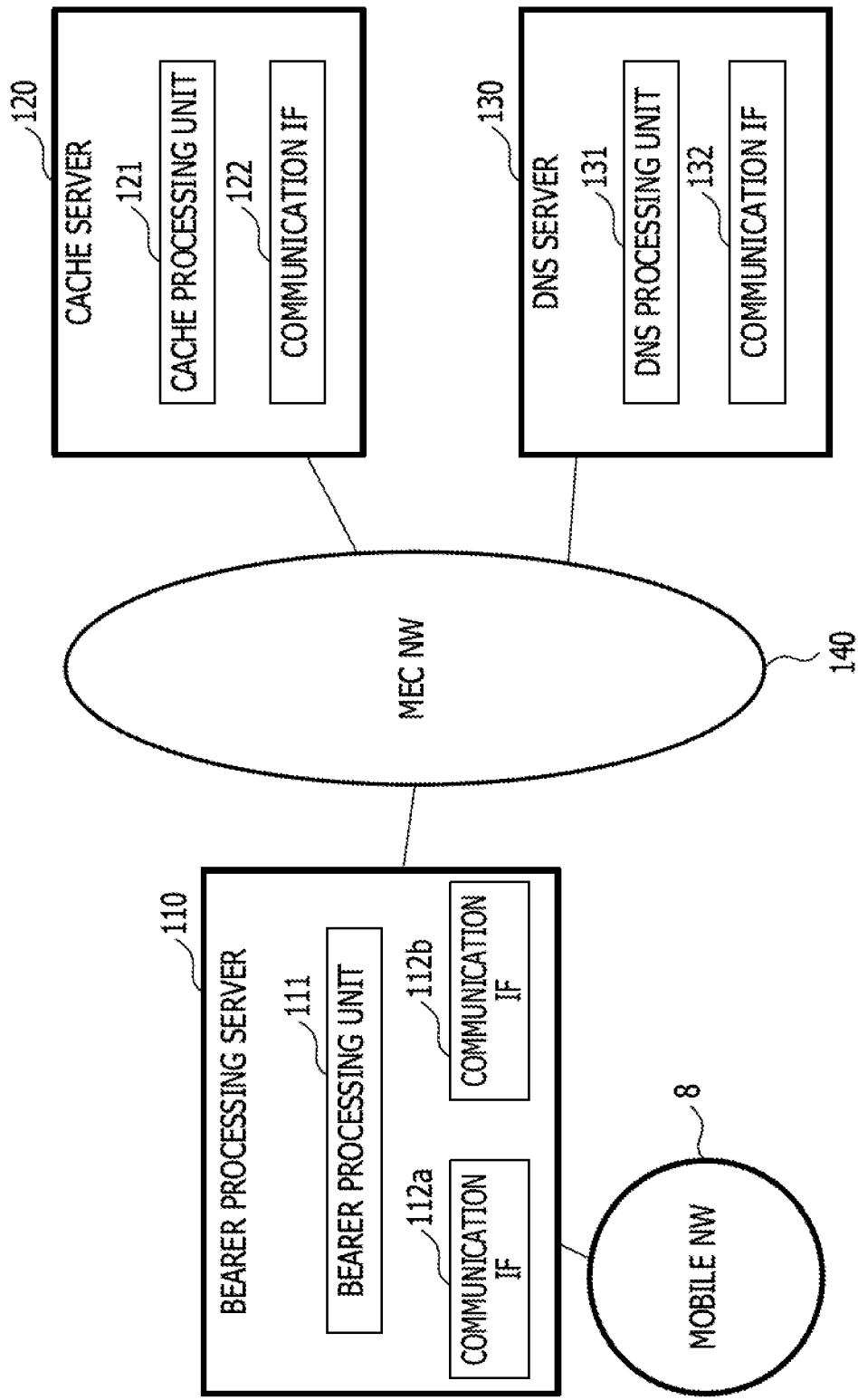
FIG. 17 is a diagram illustrating an example of a communication system.

FIG. 17 is a diagram illustrating an example of a communication system. In a system illustrated in FIG. 17, a bearer processing server 110, a cache server 120, and a DNS server 130 are connected via an MEC network 140, and thus can transmit and receive data each other. A local IP address is allocated to each of the bearer processing server 110, the cache server 120, and the DNS server 130. The bearer processing server 110 includes a bearer processing unit 111 and communication interfaces 112 (112*a* and 112*b*). The bearer processing server 110 processes a bearer in a mobile network 8. In a case in which a destination of a user packet from the terminal 10 is a local IP address, the user packet is received by the bearer processing server 110 via the mobile network 8. The communication interface 112*a* is connected to the mobile network 8 and receives a data packet from the terminal 10. The bearer processing unit 111 performs encapsulation, decapsulation, encryption, decryption, or the like when communication with the terminal 10 is performed. The communication interface 112*b* is connected to the MEC network 140. The communication interface 112*b* is used when the bearer processing server 110 communicates with the cache server 120 or the DNS server 130.

The cache server 120 includes a cache processing unit 121 and a communication interface 122. The cache processing unit 121 in the cache server 120 performs a content caching process. The DNS server 130 includes a DNS processing unit 131 and a communication interface 132. The DNS server 130 notifies the terminal 10 of an IP address associated with a domain name inquired by the terminal 10.

Figure 18:
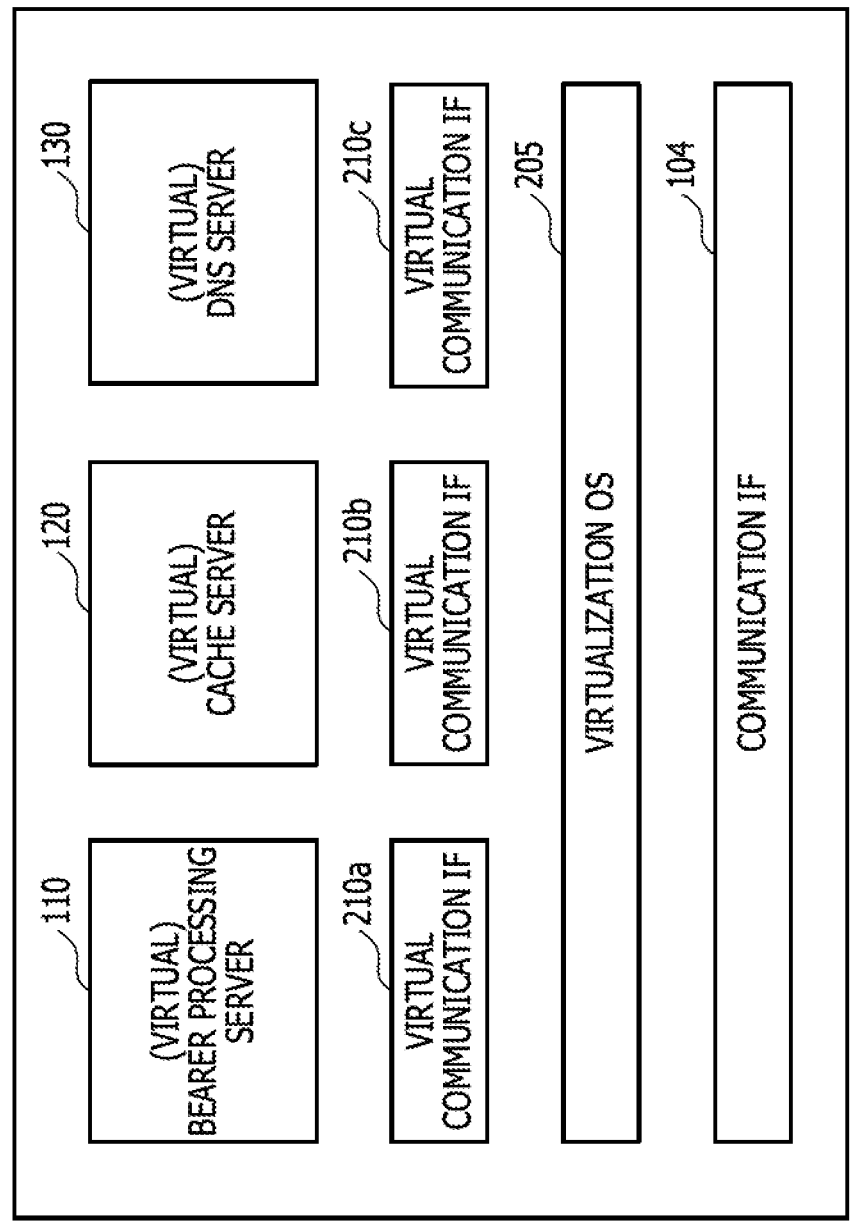
FIG. 18 is a diagram illustrating an example of the communication system.

FIG. 18 is a diagram illustrating another example of the communication system. In the communication system illustrated in FIG. 18, a virtual environment is constructed on a physical one server. The server includes a communication interface 104, a virtualization operating system (OS) 205, and virtual communication interfaces 210 (210*a* to 210*c*). The bearer processing server 110, the cache server 120, and the DNS server 130 are realized as virtual servers in the virtual environment in the server. The process of each server is the same as the process described with reference to FIG. 17. The bearer processing server 110 performs communication using a virtual communication interface 210*a* and the cache server 120 performs communication using a virtual communication interface 210*b*. Further, the DNS server 130 performs communication using a virtual communication interface 210*c*. In the example of FIG. 18, the physical server realizing the communication system can access both of the Internet 2 and the mobile network 8.

Figure 19:
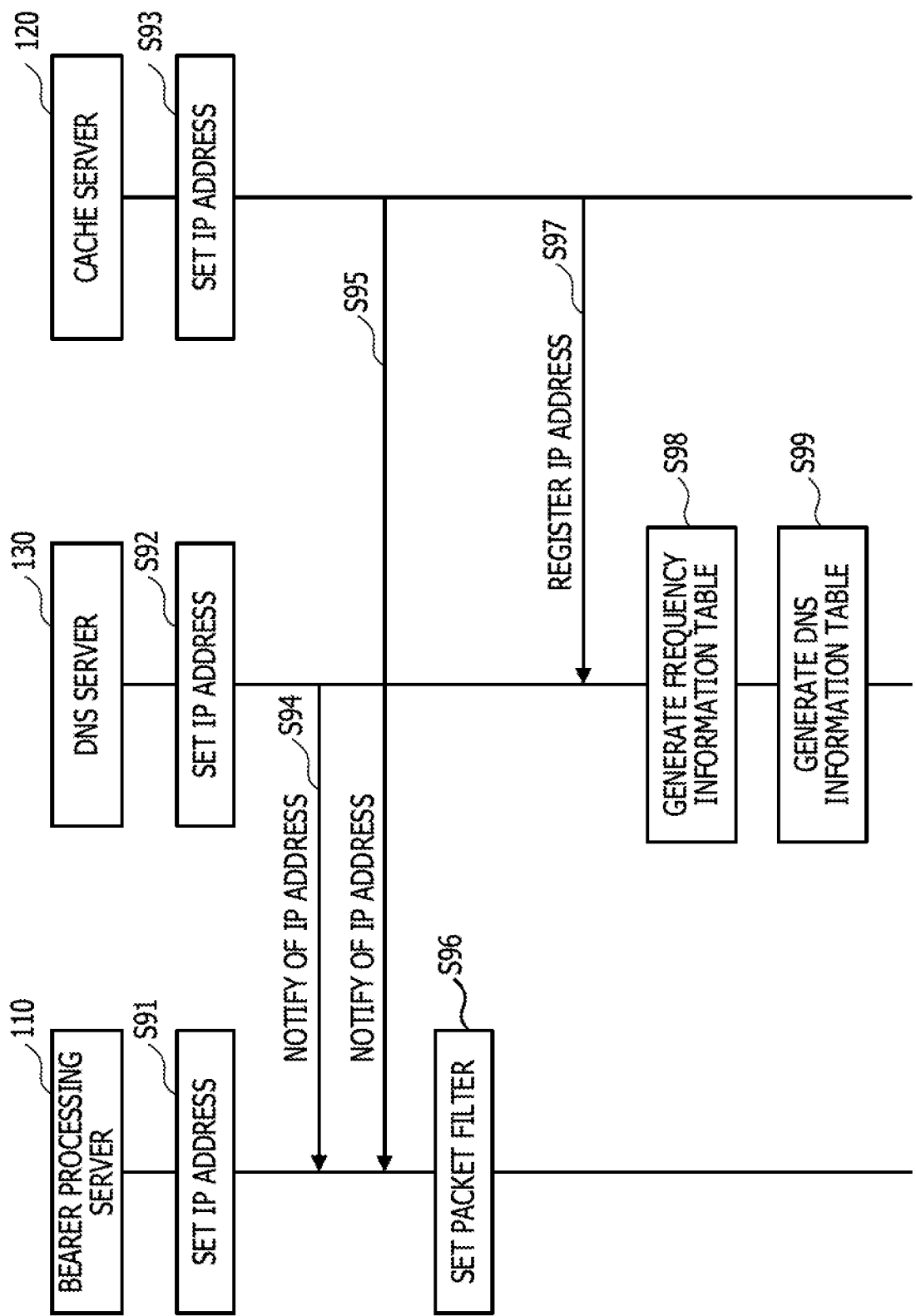
FIG. 19 is a diagram illustrating an example of initial setting performed by the communication system.

FIG. 19 is a diagram illustrating an example of initial setting performed by the communication system. A local IP address is set in each of the bearer processing server 110, the cache server 120, and the DNS server 130 (S91 to S93). Each of the cache server 120 and the DNS server 130 notifies the bearer processing server 110 of the set local IP address (S94 and S95). The bearer processing server 110 sets filter information on a bearer set in the terminal 10 to communicate with the communication system (S96). At this time, the bearer processing server 110 may set filter information using the local IP address acquired from the cache server 120 or the DNS server 130. For example, the bearer processing server 110 may set a destination IP address or an IP address mask of the filter information in a minimum range in which the IP addresses acquired from the cache server 120 and the DNS server 130 are covered. The cache server 120 registers the IP address set in the cache server 120 in the DNS server 130 (S97). Through this process, the DNS server 130 can notify the IP address of the cache server 120 in response to an inquiry about the domain name from the certain terminal 10. The DNS server 130 generates the frequency information table 41 (S98). A frequency information table 41 is the same as the frequency information table 41 described in the first embodiment. In a case in which another server 4 (not illustrated) that supplies a certain service is added to the communication system, the newly added server 4 registers a pair of an IP address allocated to the server 4 and a domain name in a service as DNS information table 42 in the DNS server (S99). In this case, when the terminal 10 inquires about the domain name of the newly registered server, the DNS server 130 can notify the terminal 10 of the IP address using the stored pair. The DNS information table 42 is the same as the DNS information table 42 described in the first embodiment.

Figure 20:
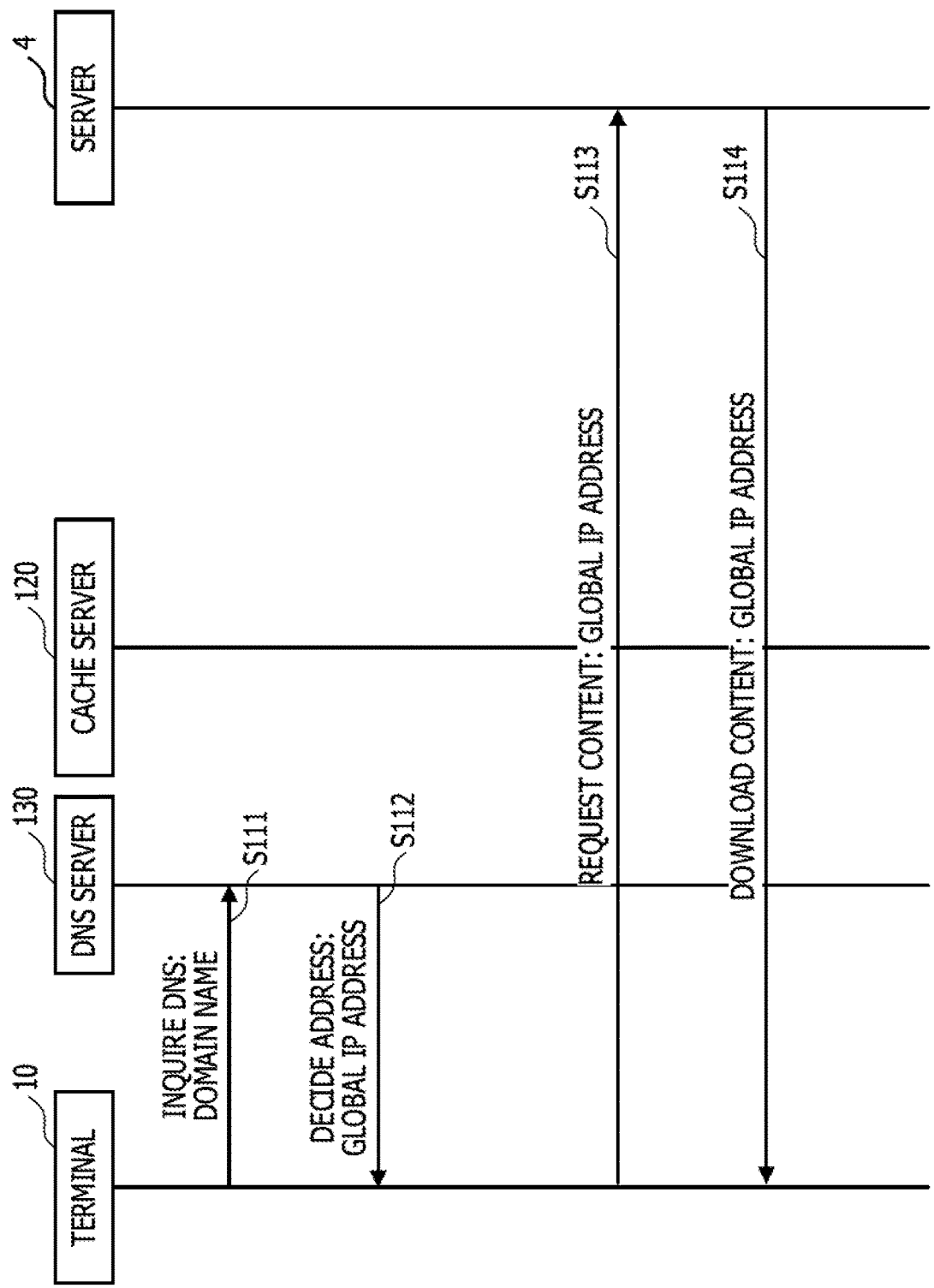
FIG. 20 is a diagram illustrating an example of a communication process executed by the communication system.

FIG. 20 is a diagram illustrating an example of a communication process executed by the communication system until a frequency of inquiries reaches a threshold. It is assumed that the terminal 10 transmits an inquiry about the domain name used for the service supplied from the server 4 to the DNS server 130 (S111). The bearer processing server 110 relays communication between the terminal 10 and the DNS server 130. The DNS server 130 specifies the IP address corresponding to the inquired domain name using the DNS information table 42. Here, since the frequency of the inquiries does not reach a threshold, a kind of address of which the terminal 10 is notified is set in a global IP address. Accordingly, the DNS server 130 notifies the terminal 10 of the global IP address allocated to the server 4 (S112). The terminal 10 transmits a content request to the server 4 using the notified global IP address (S113). At this time, the terminal 10 access the server 4 via the EPC-GW 6 without using a bearer used for communication via the communication system. The server 4 transmits a response including the requested content to the terminal 10 via the EPC-GW 6 in response to a content request from the terminal 10 (S114). Therefore, the terminal 10 can acquire the requested content.

Figure 21:
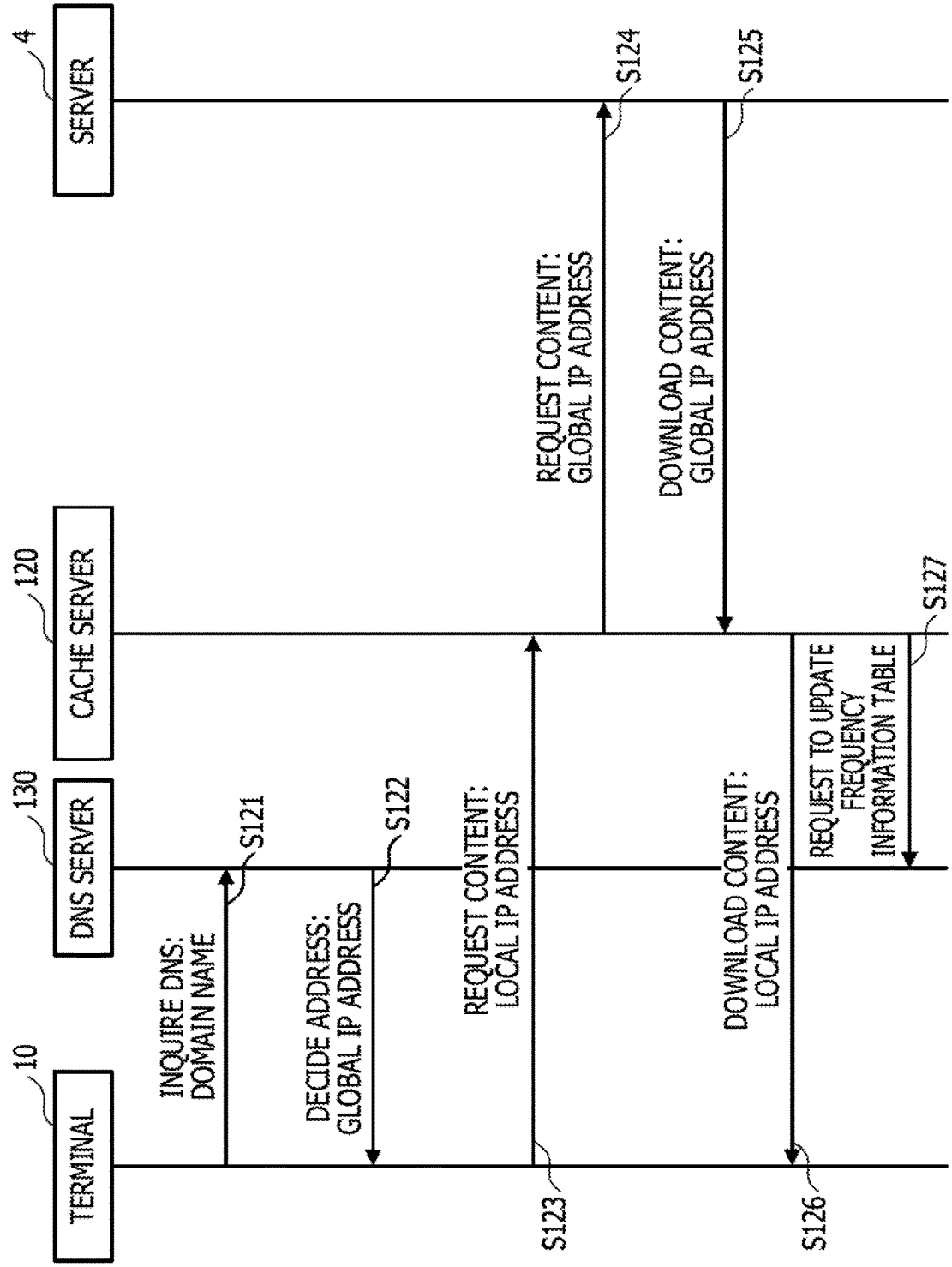
FIG. 21 is a diagram illustrating an example of a communication process executed by the communication system.

FIG. 21 is a diagram illustrating an example of a communication process when the caching process is executed. In an initial state of FIG. 21, it is assumed that the number of inquiries about the domain name used in the server 4 is the same value as the threshold A in the frequency information table 41. In this state, it is assumed that an inquiry about the domain name used in the server 4 is transmitted from the terminal 10 to the DNS server 130 (S121). The bearer processing server 110 relays communication between the terminal 10 and the DNS server 130. The DNS server 130 notifies the terminal 10 of the local IP address of the cache server 120 as information associated with the domain name (S122). Then, the terminal 10 transmits a content request destined for the local IP address of the cache server 120 (S123). In the process of transmitting the content request in S123, a destination address is the local IP address allocated to the cache server 120. Therefore, a bearer set for communication with the communication system is used. The bearer processing server 110 relays the communication between the terminal 10 and the cache server 120.

When the content request is received, the cache server 120 determines whether requested content is stored in the cache processing unit 121. Here, it is assumed that the requested content is not stored in the cache processing unit 121. Then, the cache server 120 transmits the content request to the server 4 (S124). The content request transmitted in S124 is generated through the same process as the process described with reference to FIG. 9. Further, the cache server 120 also generates the relay destination table 43 to transmit data to the terminal 10.

The server 4 transmits a response including the requested content to the cache server 120 in response to the content request from the cache server 120 (S125). The cache server 120 generates the response destined for the terminal 10 and including the acquired content using information in the relay destination table 43. This process is the same as the process described with reference to FIG. 11. The cache server 120 transmits the response to the terminal 10 (S126).

The cache server 120 determines whether the content acquired from the server 4 is a cache processing target from the details such as a header of the content. In a case in which the content is not the cache processing target, the cache server 120 requests the DNS server 130 to update the frequency information table 41 (S127). In the update requested in S127, the cache server 120 request the DNS server 130 to set the cache setting associated with domain name included in the URI of the content in the frequency information table 41 to "target exclusion". The DNS server 130 updates the frequency information table 41 in response to the request of S127. Further, the DNS server 130 sets a kind of notification target IP address associated with the domain name included in the URI of the content in the frequency information table 41 to the global IP address in the DNS information table 42. Therefore, in the server that stores content which is not a cache processing target, the terminal 10 performing an inquiry using the domain name is notified of the global IP address.

Conversely, in a case in which the content acquired from the server 4 by the cache server 120 is a cache processing target, the process of S127 is not executed. Therefore, in the frequency information table 41, the cache setting for a domain of a service supplied by the server 4 remains to be "valid". Even in the DNS information table 42, a notification target IP address for the domain of the service supplied by the server 4 remains to be set to a local IP address of the cache server 120. Therefore, a subsequent content request is made to the cache server 120.

Figure 22:
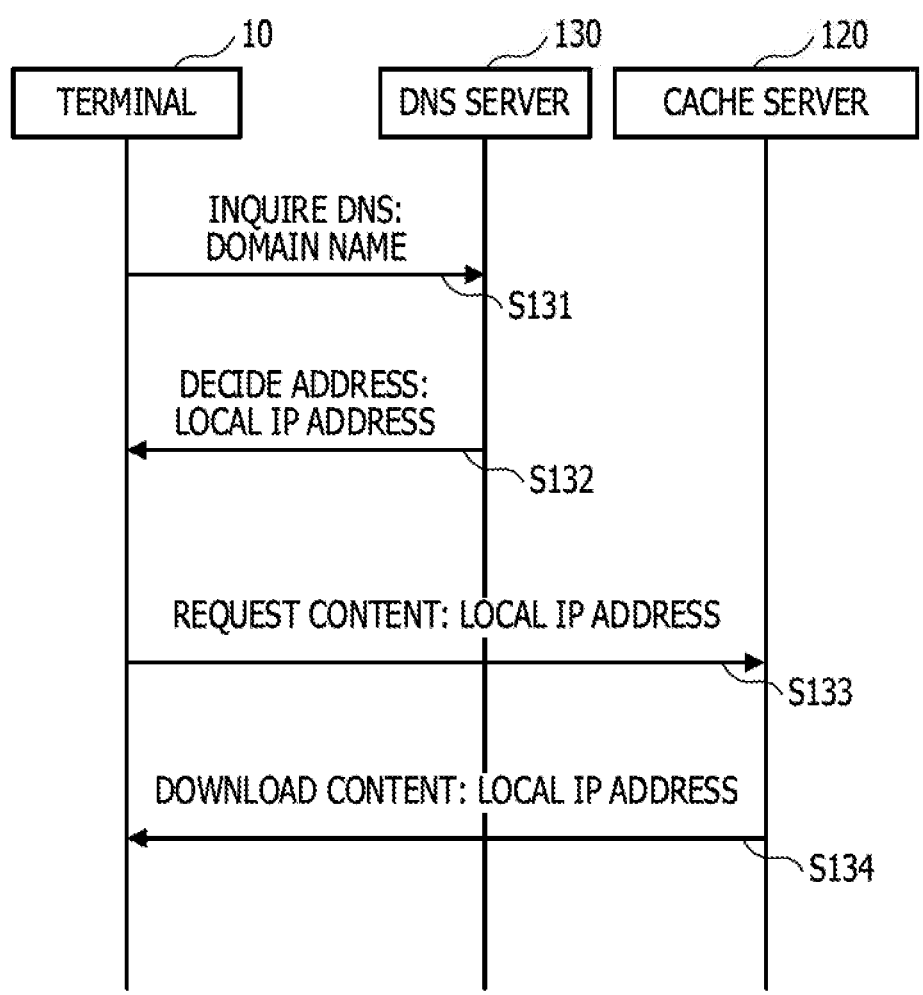
FIG. 22 is a diagram illustrating an example of a communication process executed by the communication system.

FIG. 22 is a diagram illustrating an example of a communication process executed by the communication system in a case in which content cached in the cache server 120 is requested from the terminal 10. An inquiry about a domain name included in an URI of content is transmitted from the terminal 10 to the DNS server 130 (S131). The DNS server 130 notifies the terminal 10 of the local IP address of the cache server 120 as information associated with a domain name (S132). The terminal 10 transmits a content request destined for the local IP address of the cache server 120 (S133). In the process of transmitting the content request in S133, the destination address is a local IP address allocated to the cache server 120. Therefore, a bearer set for communication with the communication system is used. When the content request is received, the cache processing unit 121 in the cache server 120 determines whether the requested content is stored. Here, since the requested content is stored in the cache processing unit 121, the cache server 120 transmits a response to the terminal 10 (S134).

As described above, in the second embodiment, the same process as that executed by the communication apparatus 20 is executed by the communication system. Therefore, according to a cache situation or a history of previous inquiries of the domain names, an address notified as the IP address associated with the domain name is determined in the terminal 10. Accordingly, in a case in which content is not a cache processing target, a process between the terminal 10 and the server 4 is executed without involving the communication system is executed. Therefore, a process load on the communication system is reduced.

Others

The embodiments are not limited to the foregoing embodiments and may be modified in various forms. Hereinafter, several examples will be described.

The examples of the tables and the examples of the formats of the packets described above are merely examples. Accordingly, information components in the tables or the formats of the packets can be changed according to mounting.

In FIG. 18, the case in which the bearer processing server 110, the cache server 120, and the DNS server 130 are realized as the virtual servers in one physical server has been described. These virtual servers may be realized by a plurality of physical servers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication method executed by a processor included in a communication apparatus, the method comprising:

storing a target data in a cache memory device in the communication apparatus;

receiving an inquiry including a domain name corresponding to the target data from a terminal apparatus;

selecting an address from among an address allocated to the server identified with the domain name and an address allocated to the communication apparatus storing the target data as an address of which the terminal apparatus is notified based on a frequency of inquiries about the domain name; and transmitting the selected address to the terminal apparatus, wherein the communication method further comprising:

determining whether cache setting corresponding to a domain name included in the inquiry indicates that a caching process is valid by referring to the domain name, the frequency of inquiries, and frequency information associated with the cache setting indicating whether the caching process by the communication apparatus is valid when the inquiry is received; and determining whether the frequency exceeds a predetermined threshold when it is determined that the cache setting does not indicate that the caching process is valid.

2. The communication method according to claim 1, wherein the selecting includes:

selecting the address allocated to the server identified with the domain name when the frequency does not exceed a predetermined threshold; and selecting the address allocated to the communication apparatus when the frequency exceeds the predetermined threshold.

3. The communication method according to claim 1, wherein the determining includes selecting the address allocated to the server identified with the domain name when it is determined that the cache setting indicates the caching process is valid.

4. The communication method according to claim 3, wherein the determining includes notifying a transmission source of another inquiry of another address allocated to the communication apparatus when an other inquiry about a domain name associated with a storage destination of data stored in the cache memory device is received; and wherein the method further comprises:

receiving another access request destined for the another address, extracting the data from the cache memory device when data requested by the other access request is contained in the cache memory device, and transmitting the extracted data to a transmission source of the other access request.

5. The communication method according to claim 1, further comprising:

updating the frequency information so that the cache setting indicates that the caching process is valid when it is determined that the frequency of inquiries exceeds the predetermined threshold.

6. The communication method according to claim 1, further comprising:

acquiring the target data requested with an access request from a server as a storage destination of the target data when the access request destined for the address allocated to the communication apparatus is received; and transmitting the acquired target data to a transmission source of the access request.

7. The communication method according to claim 6, further comprising:

storing the target data in the cache memory device in the communication apparatus when a caching process for the target data is valid.

8. The communication method according to claim 7, further comprising:

changing an address to be notified as a response to the inquiry about a domain name associated with a storage destination of the target data from the address allocated to the communication apparatus to the address allocated to the server when the target data is not stored in the cache memory device.

9. A communication apparatus comprising:

a memory; and a processor coupled to the memory and configured to:

store a target data in a cache memory device in the communication apparatus, receive an inquiry including a domain name corresponding to the target data from a terminal apparatus, select an address from among an address allocated to the server identified with the domain name and an address allocated to the communication apparatus storing the target data as an address of which the terminal apparatus is notified based on a frequency of the inquiries about the domain name, and transmit the selected address to the terminal apparatus, wherein the processor is configured to:

determine whether cache setting corresponding to a domain name included in the inquiry indicates that a caching process is valid by referring to the domain name, the frequency of inquiries, and frequency information associated with the cache setting when the inquiry is received, and determine whether the frequency of inquiries exceeds a predetermined threshold when it is determined that the cache setting does not indicate that the caching process is valid.

10. The communication apparatus according to claim 9, wherein the processor is configured to:

select the address allocated to the server identified with the domain name when the frequency of inquiries does not exceed a predetermined threshold, and select the address allocated to the communication apparatus when the frequency of inquiries exceeds the predetermined threshold.

11. The communication apparatus according to claim 9, wherein the processor is configured to select address allocated to the server identified with the domain name when it is determined that the cache setting indicates the caching process is not valid.

12. The communication apparatus according to claim 9, wherein the processor is configured to update the frequency information so that the cache setting indicates that the caching process is valid when it is determined that the frequency of inquiries exceeds the predetermined threshold.

* * * * *